US009733879B2

(12) United States Patent
Asai

(10) Patent No.: US 9,733,879 B2
(45) Date of Patent: Aug. 15, 2017

(54) INFORMATION PROCESSING APPARATUS, RECORDING SYSTEM, COMPUTER READABLE MEDIUM

(71) Applicant: BROTHER KOGYO KABUSHIKI KAISHA, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/966,063

(22) Filed: Dec. 11, 2015

(65) Prior Publication Data
US 2016/0173704 A1    Jun. 16, 2016

(30) Foreign Application Priority Data

Dec. 11, 2014    (JP) .................................. 2014-250921

(51) Int. Cl.
G06F 3/12 (2006.01)
H04N 1/00 (2006.01)

(52) U.S. Cl.
CPC .......... G06F 3/1292 (2013.01); G06F 3/1205 (2013.01); G06F 3/1227 (2013.01); G06F 3/1286 (2013.01); H04N 1/00962 (2013.01)

(58) Field of Classification Search
USPC ....................................... 358/1.15
See application file for complete search history.

(56) References Cited

U.S. PATENT DOCUMENTS

2009/0103124 A1* 4/2009 Kimura ................ G06F 3/1204
358/1.15
2009/0315867 A1* 12/2009 Sakamoto ........... G06F 3/03547
345/184
2014/0323060 A1* 10/2014 Shimazaki ........... H04W 48/20
455/73

FOREIGN PATENT DOCUMENTS

JP    2006-163990 A    6/2006

OTHER PUBLICATIONS

Furuya Satoyuki, Print Setting Change, Jun. 22, 2006, Machine Translated Japanese Pantent Application Publication, JP2006163990 Listed on IDS, All Pages.*

* cited by examiner

Primary Examiner — Ngon Nguyen
(74) Attorney, Agent, or Firm — Scully, Scott, Murphy & Presser, PC

(57) ABSTRACT

An information processing apparatus includes: a display; user interface a user interface; a storage configured to store an external program; a network interface configured to perform wireless communication with an image recording apparatus capable of executing recording processing of recording an image on a sheet according to a setting value; and a controller configured to execute: external acquisition processing of executing the external program for determining the print data based on a user's operation and acquiring the print data; preview display processing of generating a preview image and displaying the preview image on the display; first reception processing of receiving a touch operation of instructing execution of the recording processing through the user interface; and output processing of, when the first touch operation is received, transmitting recording instruction information for executing the recording processing of the print data to the image recording apparatus.

20 Claims, 13 Drawing Sheets

FIG.2A
| PROGRAM ID | APPLICATION NAME | INSTALL INFORMATION | FIRST ICON | SECOND ICON | THIRD ICON |
|---|---|---|---|---|---|
| 001 | MAP APPLICATION | INSTALLED |  |  | 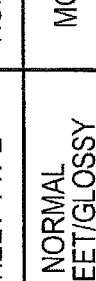 |
| 002 | IMAGE EDITING APPLICATION | NOT-INSTALLED | — |  | |
| ⋮ | | | | | |
FIG.2B
| PRINTER ID | SETTING VALUE LIST | | |
|---|---|---|---|
| | SHEET SIZE | SHEET TYPE | NUMBER OF COLORS |
| PRINTER A | A4/B4/L SIZE | NORMAL SHEET/GLOSSY SHEET | MONOCHROME TO FULL COLORS |

FIG.3A

| PROGRAM ID | FIRST SETTING VALUE |||
| --- | --- | --- | --- |
|  | SHEET SIZE | SHEET TYPE | NUMBER OF COLORS |
| 001 | A4 | NORMAL SHEET | 256 COLORS |
| 002 | L SIZE | GLOSSY SHEET | FULL COLORS |

FIG.3B

| FORMAT INFORMATION | SECOND SETTING VALUE |||
| --- | --- | --- | --- |
|  | SHEET SIZE | SHEET TYPE | NUMBER OF COLORS |
| PNG | L SIZE | GLOSSY SHEET | FULL COLORS |
| PDF | A4 | NORMAL SHEET | 256 COLORS |
| TXT | A4 | NORMAL SHEET | MONOCHROME |
| .... | .... | .... | .... |

FIG.3C

| SETTING VALUE ID | DESIGNATED SETTING VALUE |||
| --- | --- | --- | --- |
|  | SHEET SIZE | SHEET TYPE | NUMBER OF COLORS |
| 001A | L SIZE | GLOSSY SHEET | FULL COLORS |
| 001B | A4 | NORMAL SHEET | MONOCHROME |
| 002A | B5 | NORMAL SHEET | 256 COLORS |
| .... | .... | .... | .... |

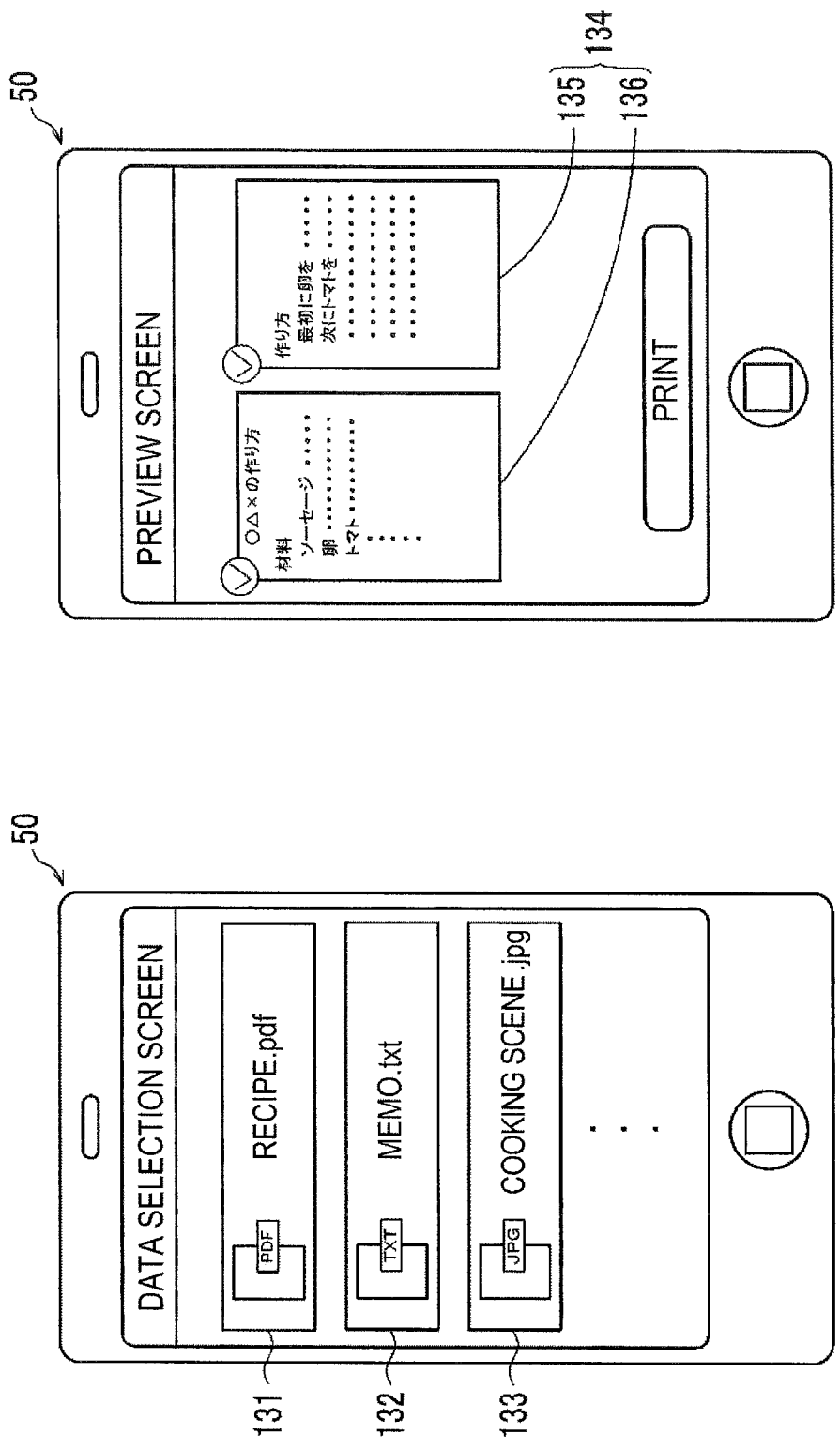

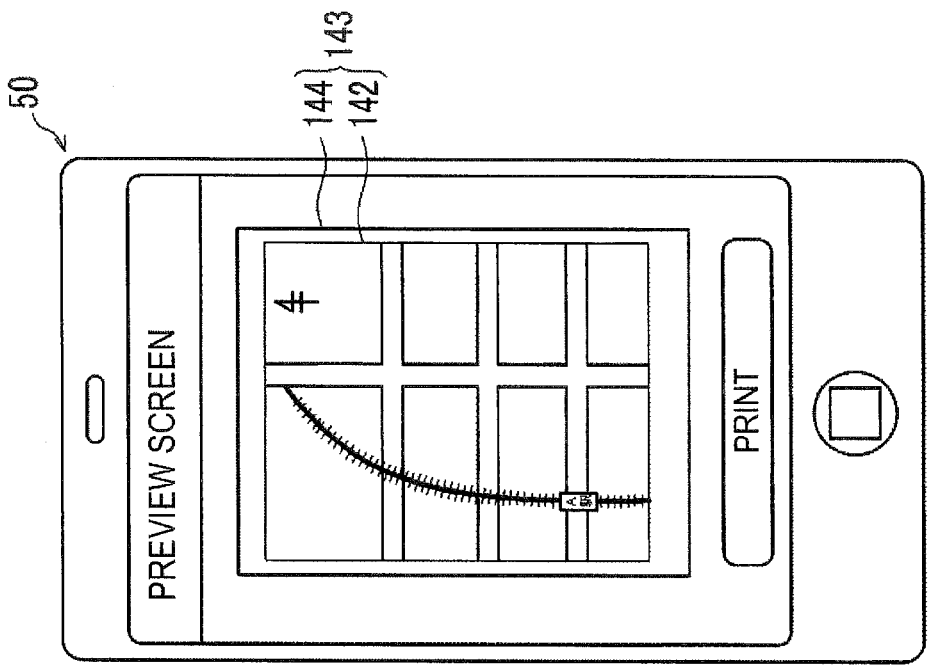
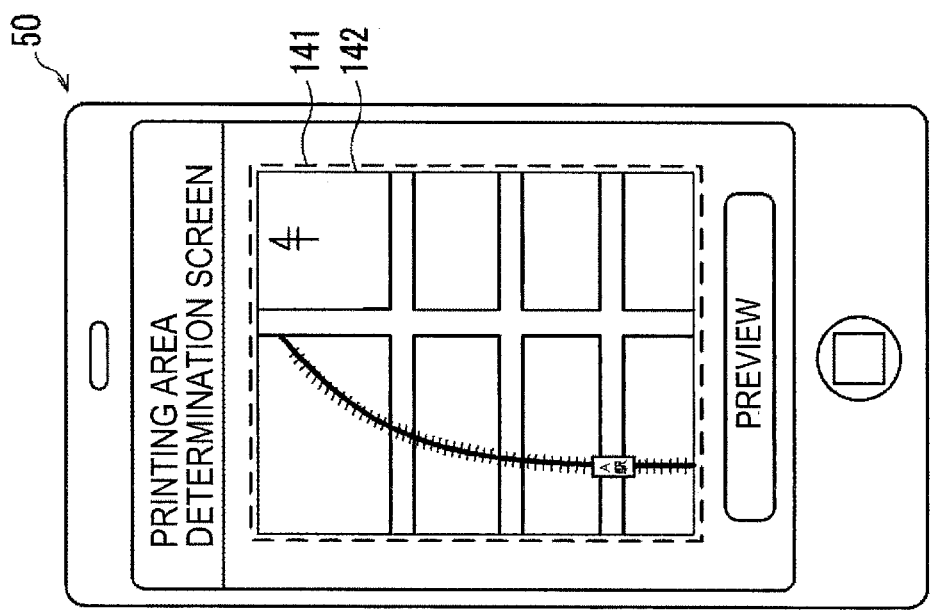

INFORMATION PROCESSING APPARATUS, RECORDING SYSTEM, COMPUTER READABLE MEDIUM

CROSS REFERENCE TO RELATED APPLICATION

This application is based upon and claims the benefit of priority of Japanese Patent Application No. 2014-250921 filed on Dec. 11, 2014, the contents of which are incorporated herein by reference in its entirety.

BACKGROUND

The disclosure relates to a computer readable medium storing a printing program configured to cause an image recording apparatus to execute recording processing of print data acquired from a data acquisition source.

In the related art, a program configured to cause an image recording apparatus to execute recording processing of recording an image, which is represented by data acquired from a data acquisition source, on a sheet has been known. A program is known which is capable of allowing a user to select photograph data stored in a mobile terminal, data stored in a storage server, HTML data configuring a WEB page and the like and causing an image recording apparatus to execute recording processing of the selected data.

SUMMARY

Here, an appropriate interface for enabling the user to select the print data is different depending on data types, for example. For instance, in order to select one of a plurality of photograph data, an interface is appropriate which is configured to display a list of a plurality of icons, which represents the respective photograph data, and to receive a user's operation of selecting one of the listed icons. In another example, in order to extract a desired area from a map image, an interface is appropriate which is configured to display the map image and to receive a user's operation of designating a print range on the map image.

However, it is a heavy burden for a program developer to implement the plurality of interfaces in one program. The burden increases as types of the print data to be supported increase.

It is therefore an object of the disclosure to provide a printing program configured to provide an interface for appropriately selecting print data without excessively increasing a developer's burden.

An aspect of the present disclosure provides the following arrangements:

A non-transitory computer readable recording medium stores a printing program configured to be executed by a computer comprising a display, an user interface, a storage configured to store an external program and a network interface configured to perform wireless communication with an image recording apparatus which configured to execute recording processing of recording an image, represented by print data, on a sheet according to setting values, the printing program, when executed by the computer, causing the computer to execute: external acquisition processing of executing the external program for determining the print data, which is a target of the recording processing, based on a user's operation and acquiring the print data determined with the external program; preview display processing of generating a preview image representing a state where a print image represented by the print data is recorded on the sheet, and displaying the preview image on the display; first reception processing of receiving a first touch operation of instructing execution of the recording processing of the print data through the user interface at a state where the preview image is displayed on the display; and output processing of, when the first touch operation is received in the first reception processing, transmitting recording instruction information for executing the recording processing of the print data to the image recording apparatus through the network interface.

An information processing apparatus comprises: a display; an user interface; a storage configured to store an external program; a network interface configured to perform wireless communication with an image recording apparatus configured to execute recording processing of recording an image, which is represented by print data, on a sheet according to a setting value; and a control unit configured to execute: external acquisition processing of executing the external program for determining the print data, which is a target of the recording processing, based on a user's operation and acquiring the print data determined with the external program; preview display processing of generating a preview image representing a state where a print image represented by the print data is recorded on the sheet, and displaying the preview image on the display; first reception processing of receiving a first touch operation of instructing execution of the recording processing of the print data through the user interface at a state where the preview image is displayed on the display; and output processing of, when the first touch operation is received in the first reception processing, transmitting recording instruction information for executing the recording processing of the print data to the image recording apparatus through the network interface.

A recording system comprises: an information processing apparatus comprising a display, an user interface, a storage configured to store an external program, a first network interface, and a first control unit; and an image recording apparatus comprising a recording unit configured to execute recording processing of recording an image, which is represented by the print data, on a sheet according to a setting value, a second network interface, and a second control unit. The first control unit is configured to execute: external acquisition processing of executing the external program for determining the print data, which is a target of the recording processing, based on a user's operation and acquiring the print data determined with the external program; preview display processing of generating a preview image representing a state where a print image represented by the print data is recorded on the sheet, and displaying the preview image on the display; first reception processing of receiving a first touch operation of instructing execution of the recording processing of the print data through the user interface at a state where the preview image is displayed on the display; and output processing of, when the first touch operation is received in the first reception processing, transmitting recording instruction information for executing the recording processing of the print data to the image recording apparatus through the first network interface. The second control unit is configured to cause the recording unit to execute the recording processing represented by the recording instruction information when the recording instruction information is received from the information processing apparatus through the second network interface.

BRIEF DESCRIPTION OF DRAWINGS

FIGS. 2A and 2B depicts examples of information stored in a data storage area 62B, in which FIG. 2A depicts the information of an external program that can be executed by a printing program 65 and FIG. 2B depicts a setting value list that can be used by a complex machine 10.

FIGS. 3A to 3C depicts examples of setting values stored in the data storage area 62B, in which FIG. 3A depicts a first setting value, FIG. 3B depicts a second setting value and FIG. 3C depicts a designated setting value.

FIGS. 6A and 6B depicts display examples of a menu screen, in which FIG. 6A depicts a state before a paint program is installed and FIG. 6B depicts a state after the paint program is installed.

FIGS. 7A and 7B depicts display examples of a display 53, in which FIG. 7A depicts a photograph data selection screen and FIG. 7B depicts a preview screen displayed when a photograph icon 121 is selected.

FIGS. 8A and 8B depicts display examples of the display 53, in which FIG. 8A depicts a data selection screen and FIG. 8B depicts a preview screen displayed when a data icon 131 is selected.

FIGS. 9A and 9B depicts display examples of the display 53, in which FIG. 9A depicts a printing area determination screen and FIG. 9B depicts a preview screen of a map image 142.

FIGS. 12A and 12B depicts display examples of the display 53, in which FIG. 12A depicts a temporary saving inquiry screen and FIG. 12B depicts a scan execution screen.

FIGS. 13A and 13B depicts display examples of the display 53, in which FIG. 13A depicts a saving destination selection screen and FIG. 13B depicts a temporary saving inquiry screen.

DESCRIPTION OF ILLUSTRATIVE EMBODIMENTS

Hereinafter, illustrative embodiments of the disclosure will be described with reference to the drawings. Meanwhile, the illustrative embodiments, which will be described later, are just examples of the disclosure, and the illustrative embodiments of the disclosure can be appropriately changed without changing the gist of the disclosure.

Figure 1:
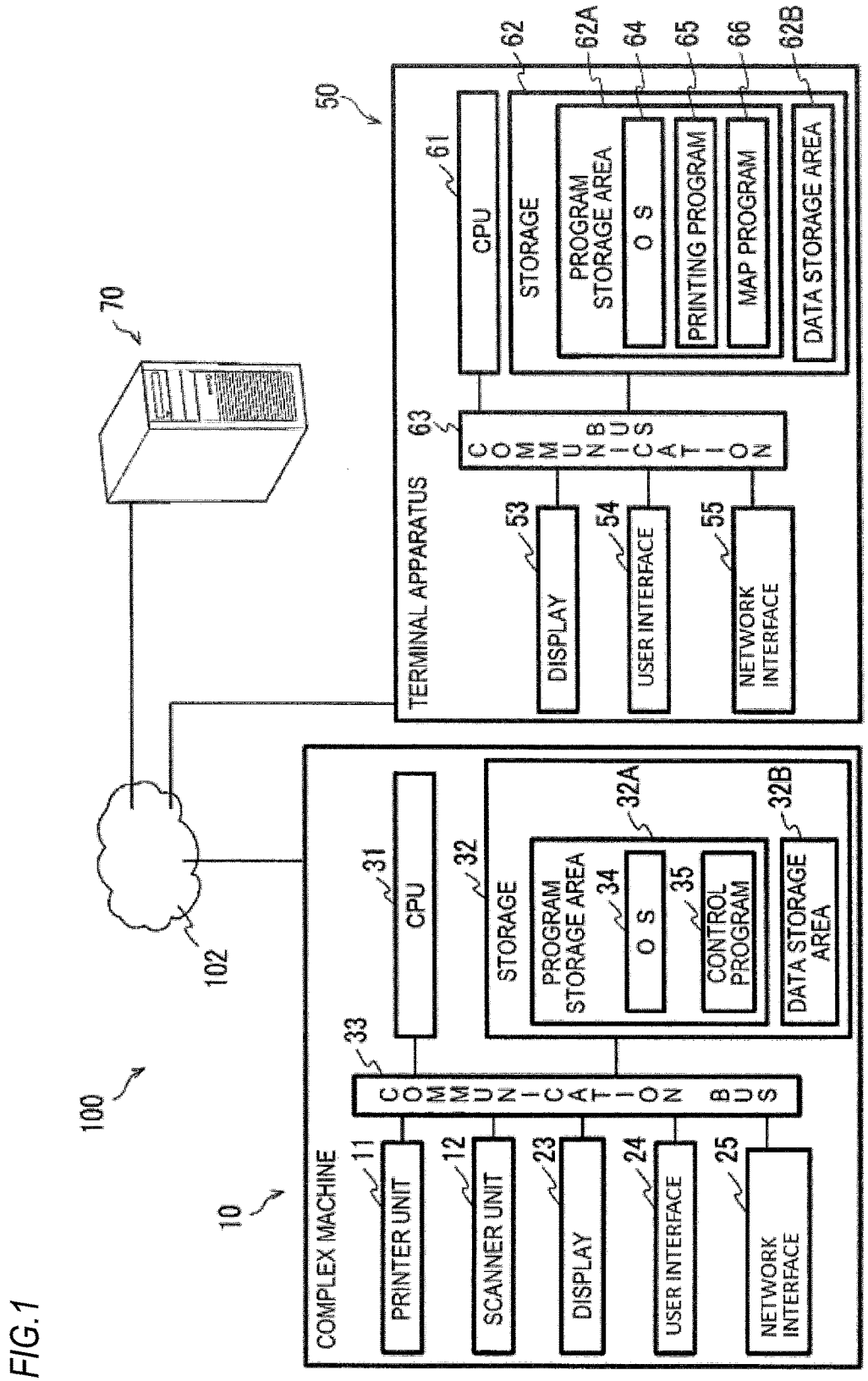
FIG. 1 is a block diagram of a recording system 100 according to an illustrative embodiment.
Figure 4:
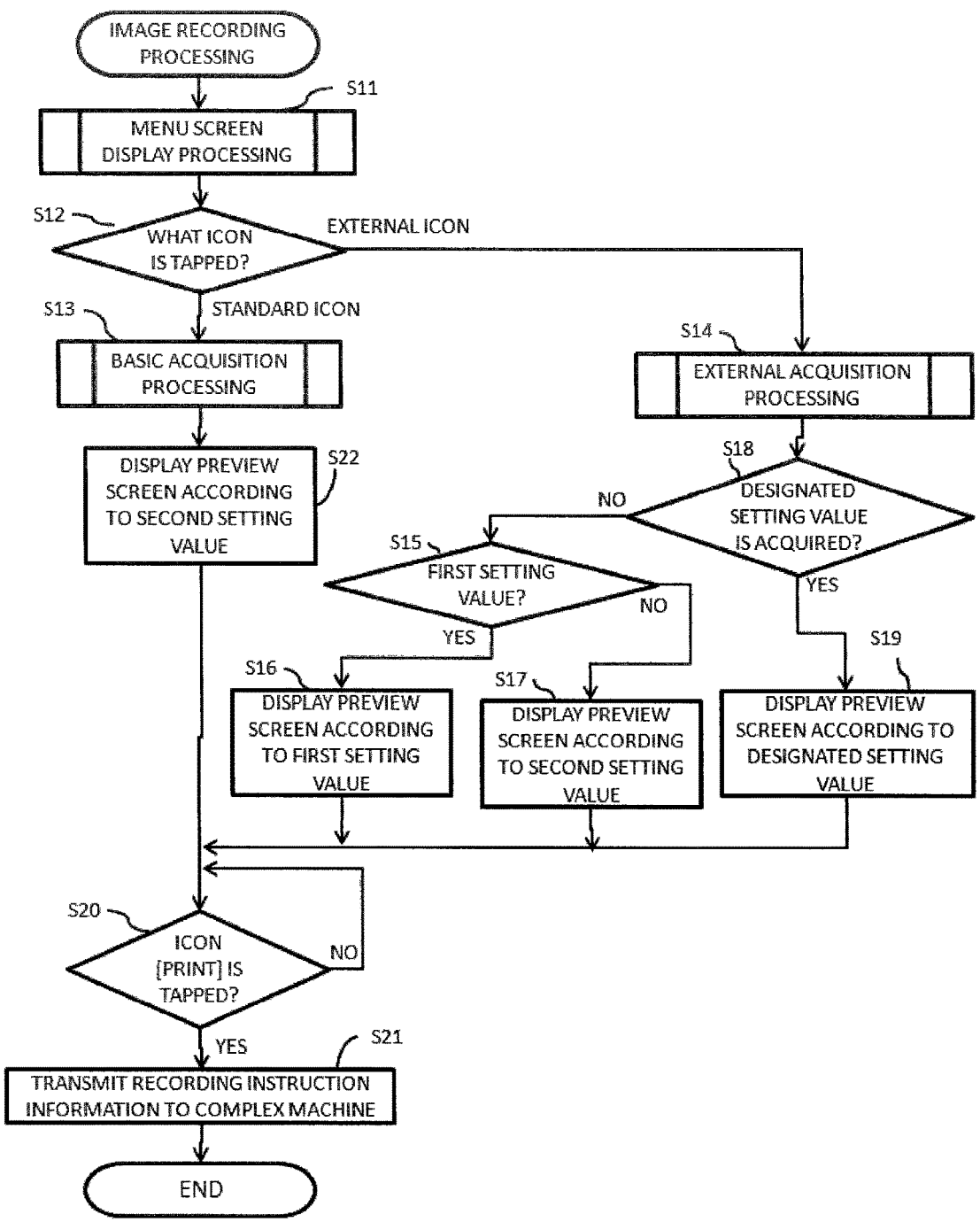
FIG. 4 is a flowchart of image recording processing according to a first illustrative embodiment.
Figure 5:
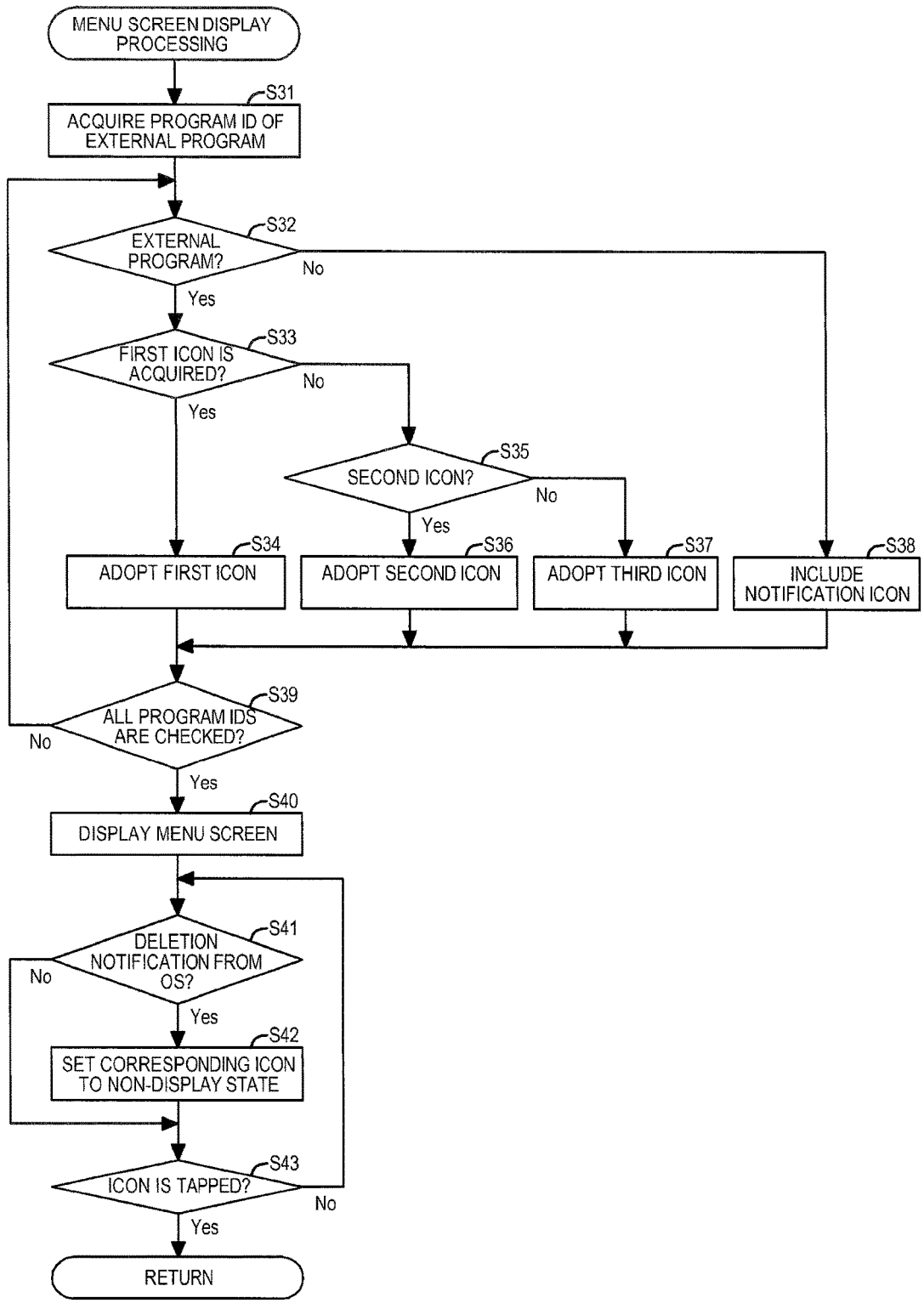
FIG. 5 is a flowchart of menu screen display processing.

FIG. 1 is a block diagram of a recording system 100 according to an illustrative embodiment. The recording system 100 shown in FIG. 1 includes a complex machine 10, a mobile terminal 50, and a service provision apparatus 70. The complex machine 10, the mobile terminal 50 and the service provision apparatus 70 are connected in communication with each other through a communication network 102. Although not particularly limited, a specific example of the communication network 102 may be the Internet, a mobile communication network, a wired LAN (abbreviation of Local Area Network), a wireless LAN or a combination thereof.

[Complex Machine 10]

As shown in FIG. 1, the complex machine 10 mainly has a printer unit 11, a scanner unit 12, a display 23, an user interface 24, a network interface 25, a CPU 31, a storage 32, and a communication bus 33. The respective constitutional elements configuring the complex machine 10 are connected each other through a communication bus 33. The complex machine 10 is an example of the image recording apparatus or the reading apparatus.

[Printer Unit 11, Scanner Unit 12]

The printer unit 11 is configured to execute recording processing of recording an image, which is represented by image data, onto a recording sheet that is an example of the sheet. Although a recording method of the printer unit 11 is not particularly limited, a well-known method such as an inkjet method and an electrophotographic method may be adopted. The scanner unit 12 is configured to execute scan processing of reading an image recorded on a recording sheet to generate image data. The complex machine 10 may further have a FAX function of transmitting and receiving facsimile data, a copy function of reading an image recorded on a recording sheet and recording the same onto another recording sheet, and the like.

[Display 23]

The display 23 has a display screen for displaying a variety of information. Although a specific configuration of the display 23 is not particularly limited, an LCD (abbreviation of Liquid Crystal Display), an OLED (abbreviation of Organic Electro-Luminescence Display) and the like may be adopted, for example.

[User Interface 24]

The user interface 24 is configured to receive a user's operation of selecting an object displayed on the display screen of the display 23. Specifically, the user interface 24 has push buttons, for example, and is configured to output a variety of operation signals associated with the pressed push buttons to the CPU 31. The user interface 24 may have a film-shaped touch sensor superimposed on the display screen of the display 23. That is, the display 23 may be configured as a touch panel display. As the touch sensor, a well-known sensor such as an electrostatic capacitance type, a resistance film type and the like may be adopted.

In the meantime, the term 'object' indicates an image that can be selected by a user's operation on the user interface 24. For example, the object may be a character string displayed on the display 23. When a direction key of the user interface 24 is pressed, one of the objects may be highlighted, and when an enter button of the user interface 24 is pressed, the highlighted object may be selected. In another example, when the user interface 24 may be configured as a touch panel, the object may be an icon, a button, a link and the like displayed on the display 23, and the object displayed at a touched position may be selected.

[Network Interface 25]

The network interface 25 includes an interface for performing communication with an external apparatus through the communication network 102. That is, the complex machine 10 is configured to output a variety of information to the mobile terminal 50 or the service provision apparatus 70 through the network interface 25 and to receive a variety of data or information from the mobile terminal 50 or the service provision apparatus 70 through the network interface 25. Although the specific communication protocol of the network interface 25 is not particularly limited, Wi-Fi (registered trademark of the Wi-Fi Alliance) may be adopted, for example.

[CPU 31]

The CPU (abbreviation of Central Processing Unit) 31 is configured to control the entire operations of the complex machine 10. The CPU 31 is configured to acquire and execute a variety of programs (which will be described later) from the storage 32, based on the variety of information output from the user interface 24 and the variety of information acquired from the external apparatus through the network interface 25. That is, the CPU 31 and the storage 32 configure an example of the control unit.

[Storage 32]

The storage 32 has a program storage area 32A and a data storage area 32B. In the program storage area 32A, an OS (abbreviation of Operating System) 34 and a control program 35 are stored. In the meantime, the control program 35 may be a single program or a combination of a plurality of programs. In the data storage area 32B, data or information necessary to execute the control program 35 is stored.

In the meantime, 'data' and 'information' in the specification have a common feature that 'data' and 'information' are bits or bit string, which can be handled by a computer. The term 'data' indicates that a semantic content represented by each bit can be handled by a computer without considering the semantic content. In contrast, the term 'information' indicates that an operation of the computer is branched by a semantic content represented by each bit. Further, the term 'instruction' indicates a control signal for urging an apparatus of a transmission destination to perform a next operation, and may include the information or may have a property as the information.

'Data' and 'information' are handled as the same data and information even though the formats (for example, a text format, a binary format, a flag format and the like) are changed for each computer, inasmuch as they are recognized as the same semantic content. For example, the information representing 'two' may be kept as information of a text format "0x32", which is the ASCII code, in one computer and may be kept as information of a binary format "10", which is the binary representation, in another computer.

However, the distinction of 'data' and 'information' is not strict, and an exceptional handling is also allowed. For example, the data may be temporarily handled as the information, and the information may be temporarily handled as the data. One that is handled as the data in an apparatus may be handed as the information in another apparatus. Further, the information may be extracted from the data, and the data may be extracted from the information.

The storage 32 is configured by a RAM (abbreviation of Random Access Memory), a ROM (abbreviation of Read Only Memory), an EEPROM (abbreviation of Electrically Erasable Programmable Read-Only Memory), an HDD (abbreviation of Hard Disk Drive), a buffer provided for the CPU 31 or a combination thereof.

In the meantime, the storage 32 may be a computer-readable storage medium. The computer-readable storage medium is a non-transitory medium. The non-transitory medium includes a recording medium such as a CD-ROM and a DVD-ROM, too. The non-transitory medium is a tangible medium. In the meantime, an electric signal for carrying a program to be downloaded from a server and the like on the Internet is a computer-readable signal medium, which is one kind of the computer-readable medium, but is not included in the non-transitory computer-readable storage medium.

The program stored in the program storage area 32A is configured to be executed by the CPU 31. However, in the specification, the operations of each program may be described while omitting the CPU 31. That is, in below descriptions, the description 'program A is configured to execute processing A' may indicate that 'CPU 31 is configured to execute processing A described in the program A'. This is also the same for the mobile terminal 50, which will be described later.

The OS 34 is a basic program for providing an API (abbreviation of Application Programming Interface) configured to control the printer unit 11, the scanner unit 12, the display 23, the user interface 24, the network interface 25 and the like, which are the hardware configuring the complex machine 10. That is, each program described above is configured to call the API provided by the OS 34, thereby controlling the respective hardware. However, in the specification, the operations of each program may be described while omitting the OS 34. That is, in below descriptions, the description 'program B is configured to control hardware C' may indicate that 'program B is configured to control hardware C through the API of the OS 34'. This is also the same for the mobile terminal 50, which will be described later.

[Mobile Terminal 50]

As shown in FIG. 1, the mobile terminal 50 mainly has a display 53, an user interface 54, a network interface 55, a CPU 61, a storage 62 and a communication bus 63. Since the display 53, the user interface 54, the network interface 55, the CPU 61, the storage 62 and the communication bus 63, which are included in the mobile terminal 50, are common to the display 23, the user interface 24, the network interface 25, the CPU 31, the storage 32 and the communication bus 33, which are included in the complex machine 10, the overlapping descriptions are omitted. The CPU 61 and the storage 62 configure an example of the control unit. The mobile terminal 50 is an example of the information processing apparatus. However, the specific example of the information processing apparatus is not limited to the mobile terminal 50 such as a smart phone, a mobile phone and a tablet terminal, and may be a PC (abbreviation of Personal Computer) and the like.

The user interface 54 of the mobile terminal 50 includes a film-shaped touch sensor superimposed on a display screen of the display 53. The user interface 54 is configured to receive a user's operation of touching the display screen of the display 53. The user interface 54 is configured to output position information indicating a position on the display screen touched by the user. The position information can be expressed by coordinates (x, y) on an x-y plane in which a left and upper end of the display screen is defined as an origin, a right direction is defined as a positive direction of an X axis and a down direction is defined as a positive direction of a y axis.

In the specification, the term 'touch' includes a variety of operations of contacting an input medium to the display screen. That is, a tap operation of separating a touched input medium from the display screen within a predetermined time period, a long touch operation of immobilizing a touched input medium on the display screen, a slide operation of sliding a touched input medium on the display screen, a flick operation where an acceleration of an input medium sliding on the display screen is equal to or greater than a threshold, a pinch-in operation of sliding two input media touched at different positions on the display screen in a direction of bringing the same into close to each other, a pinch-out operation of sliding two input media touched at different positions on the display screen in a direction of separating the same from each other, and the like are examples of the touch.

An operation of bringing an input medium close to a position spaced from the display screen by an extremely slight gap even though the input medium is not contacted to the display screen may be included to the concept of the 'touch'. The input medium may be a user's finger, a touch pen and the like.

The network interface 55 is configured to perform wireless communication with the complex machine 10 or the service provision apparatus 70 through the mobile communication network or wireless LAN. In the meantime, the description 'the mobile terminal 50 performs wireless communication with the external apparatus' is not limited to a configuration where the wireless communication is performed over the entire communication zone between the mobile terminal 50 and the external apparatus. That is, a zone between the mobile terminal 50 and a relay apparatus (for example, an access point, a base station and the like) just adjacent to the mobile terminal may be at least a wireless zone.

In the program storage area 62A of the storage 62, an OS 64, a printing program 65 and a map program 66 are stored. In the data storage area 62B of the storage 62, a variety of information shown in FIGS. 2 and 3 is stored. The data storage area 62B may be provided therein with a photograph data folder in which photograph data is to be stored.

The printing program 65 is a program for causing the complex machine 10 to execute the recording processing of the acquired print data. The map program 66 is a program for enabling a user to designate any area of a map image and transferring print data, which represents a map image of the designated area, to the printing program 65. The map program 66 is an example of the external program for determining print data, which is a target of the recording processing, based on a user's operation. In the meantime, the specific example of the external program is not limited to the map program 66, and may be a paint program for editing an image according to a user's operation and transferring print data, which represents the edited image, to the printing program 65, for example.

As shown in FIG. 2A, the data storage area 62B is configured to associate and store therein a program ID, an application name, install information, a first icon data, a second icon data and a third icon data. The image data, which represents the first icon data, may be acquired from a corresponding external program, for example. The other information or data shown in FIG. 2A may be acquired from a server apparatus (not shown) upon install or update of the printing program 65, for example.

The program ID is an example of the program identifying information for uniquely identifying the external program. The application name indicates a name of an application that is to be implemented by a corresponding program. The install information is information indicative of whether a corresponding program is installed in the mobile terminal 50. The install means that a state, in which the CPU 61 of the mobile terminal 50 can execute the program, is made. In the example of FIG. 2A, the map program 66 identified by a program ID "001" has been already installed, and the paint program identified by a program ID "002" has not been installed yet.

A first icon of the first icon data is an icon for identifying a corresponding external program, and is acquired from the external program. A second icon of the second icon data is an icon for identifying a corresponding external program from the other external programs. A third icon of the third icon data is an icon for distinction from a basic icon, which will be described later. The third icon is commonly used for all the external programs. The first icon, the second icon and the third icon are examples of the external object indicative of the external program. In the data storage area 62B, the image data representing the respective icons shown in FIG. 2A is stored.

As shown in FIG. 2B, the data storage area 62B is configured to associate and store therein a printer ID and a setting value list. The printer ID is an example of the apparatus identifying information for uniquely identifying the complex machine 10 capable of performing communication through the communication network 102. The printer ID "printer A" indicates the complex machine 10 shown in FIG. 1, for example. The setting value list can be acquired from the complex machine 10, for example. Meanwhile, in the data storage area 62B, a plurality of printer IDs and a plurality of setting values lists each of which corresponds to each printer ID may be stored. In this case, one of the plurality of printer IDs may be designated as a default printer, and each printer ID and the program ID may be associated.

The setting value list is a list of setting values that can be used in the recording processing by the printer unit 11 of the complex machine 10. The setting value is a value indicating an execution condition when the complex machine 10 is caused to execute the recording processing. In the example of FIG. 2B, the setting value includes a value indicating "sheet size" (for example, A4, B4, L size and the like), a value indicative of "sheet type" (for example, glossy sheet, normal sheet and the like), and a value indicating "number of colors" (for example, full color, 256 colors, monochrome and the like). The specific example of the setting value is not limited thereto, and may include values indicative of a sheet direction, a resolution, a magnification, the number of sheets to be printed and the like. That is, the printer unit 11 of the complex machine 10 can execute the recording processing by using the setting values selected from the setting value list shown in FIG. 2B.

As shown in FIG. 3, in the data storage area 62B, the plurality of setting values is stored. FIG. 3A depicts a first setting value associated with the program ID. FIG. 3B depicts a second setting value associated with format information. FIG. 3C depicts a designated setting value associated with a setting value ID.

The format information is information indicative of a data format of the print data. In the example of FIG. 3B, the format information indicates "PNG", which is an example of the data format of image data, "PDF", which is an example of the data format of document data, and "TXT", which is an example of the data format of text data. However, the specific example of the format information is not limited thereto.

The setting value ID is an example of the setting value identifying information for uniquely identifying a designated setting value. In the example of FIG. 3C, the setting value ID is configured by combining the program ID "001", "002" and a sub-ID "A", "B" for uniquely identifying the designated setting value of each program ID. The sub-ID is an example of the sub identifying information. The specific example of the setting value ID is not particularly limited, and may not include the program ID if the designated setting value stored in the data storage area 62B can be uniquely identified. The setting value ID including the program ID may also be designated only by the external program that is to be identified by the program ID. In the meantime, the setting value ID, which does not include the program ID, may also be designated by all the external programs.

All of the first setting value, the second setting value and the designated setting value are examples of the setting value. However, the information to be associated is different. In FIGS. 3A to 3C, the same setting value may also exist. The respective setting values shown in FIGS. 3A to 3C may be programmed in advance in the printing program 65, may be acquired from the server apparatus upon the install or update of the printing program 65, or may be acquired from the server apparatus at any timing such as upon activation of the printing program 65.

In the meantime, the respective setting values shown in FIGS. 3A to 3C may be acquired from the server apparatus by the printing program 65 or from the server apparatus by a program configured to install or update the printing program 65. Each setting value may be set or changed at any timing by the user. Further, each setting value may be stored in an area of the data storage area 62B allotted to the printing program 65 from the OS 64 upon the install or update of the printing program 65.

[Service Provision Apparatus 70]

The service provision apparatus 70 is an apparatus configured to provide a service that is to be used by the mobile terminal 50. The service provision apparatus 70 is provided on the Internet, and is configured to provide a variety of services according to requests from the mobile terminal 50. The service provision apparatus 70 is an apparatus configured to provide a storage service such as 'Evernote (registered trademark of Evernote Corporation)', 'Dropbox (registered trademark of DropBox, Inc.)', 'Google Drive (Google is a registered trademark of Google, Inc.)' and the like, for example.

[Operations of Recording System 100]

Image recording processing according to the first illustrative embodiment is described with reference to FIGS. 4 to 9. The image recording processing is processing where the complex machine 10 is caused to execute the recording processing of the print data determined at the mobile terminal 50, based on the user's operation.

First, the printing program 65 of the mobile terminal 50 executes menu screen display processing (S11). The menu screen display processing is processing of displaying a menu screen shown in FIG. 6 on the display 53, for example. The menu screen display processing is described in detail with reference to FIG. 5.

The printing program 65 acquires the program ID of the external program from the data storage area 62B shown in FIG. 2A (S31). The processing of step S31 is an example of the identification information acquisition processing. The printing program 65 of the first illustrative embodiment reads out the program IDs "001", "002" shown in FIG. 2A from the data storage area 62B, in step S31. Meanwhile, the acquisition destination of the program ID in step S31 is not limited to the data storage area 62B and may be the server apparatus (not shown), for example.

Then, the printing program 65 determines whether the external program identified by the program ID acquired in step S31 is stored in the program storage area 62A, more specifically, whether the external program is installed (S32). Specifically, the printing program 65 may inquire of the OS 64 whether the external program identified by the program ID acquired in step S31 is installed, and may receive reply information from the OS 64. The printing program 65 may compare whether the program ID, which is read out from each external program stored in the program storage area 62A, coincides with the program ID acquired in step S31. The processing of step S32 is an example of the determination processing.

When it is determined that the external program identified by the acquired program ID is stored in the program storage area 62A (S32: Yes), the printing program 65 determines an external icon that is to be included in the menu screen (S33 to S37). On the other hand, when it is determined that the external program identified by the acquired program ID is not stored in the program storage area 62A (S32: No), the printing program 65 includes a notification icon in the menu screen (S38). The notification icon is an example of the notification object for notifying that there is an external program capable of being installed in the mobile terminal 50.

Specifically, when it is possible to acquire the first icon data from the external program (S33: Yes), the printing program 65 adopts the first icon data (S34). The first icon data may be acquired upon the install of the external program or may be acquired in step S34. For example, the printing program 65 may read out the first icon data from the area of the data storage area 62B allotted to the external program from the OS 64. The printing program 65 may request the first icon data from the external program and receive the first icon data from the external program. Further, the printing program 65 may request the first icon data of the external program from the OS 64, and receive the first icon data from the external program via the OS 64.

When it is not possible to acquire the first icon data and the second icon data corresponding to the external program is stored in the data storage area 62B (S33: No & S35: Yes), the printing program 65 adopts the second icon data (S36). In the meantime, the second icon data may be stored in the area of the data storage area 62B allotted to the printing program 65 from the OS 64 at the same timing or with the same method as each setting value shown in FIGS. 3A to 3C, for example. Further, when the second icon data corresponding to the external program is not stored in the data storage area 62B (S35: No), the printing program 65 adopts the third icon data (S37). The third icon data can be commonly used for all the external programs without being associated with a specific program ID.

The printing program 65 executes the processing of steps S32 to S38 for the external programs identified by all the program IDs acquired in step S31 (S39: No). The printing program 65 of the first illustrative embodiment determines that the map program 66 identified by the program ID "001" is stored in the program storage area 62A, and adopts the first icon data acquired from the map program 66. The printing program 65 determines that the paint icon data identified by the program ID "002" is not stored in the program storage area 62A, and includes the notification icon in the menu screen.

Figure 6B:
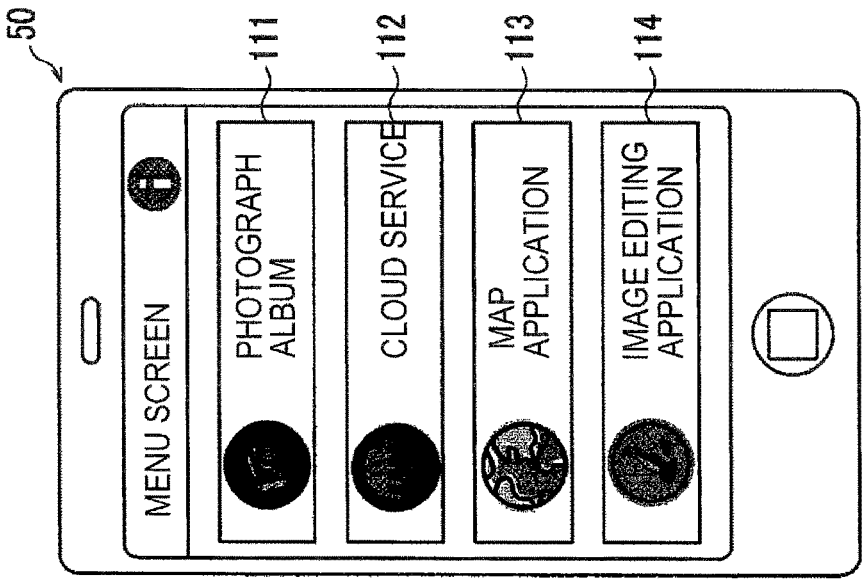
Figure 6A:
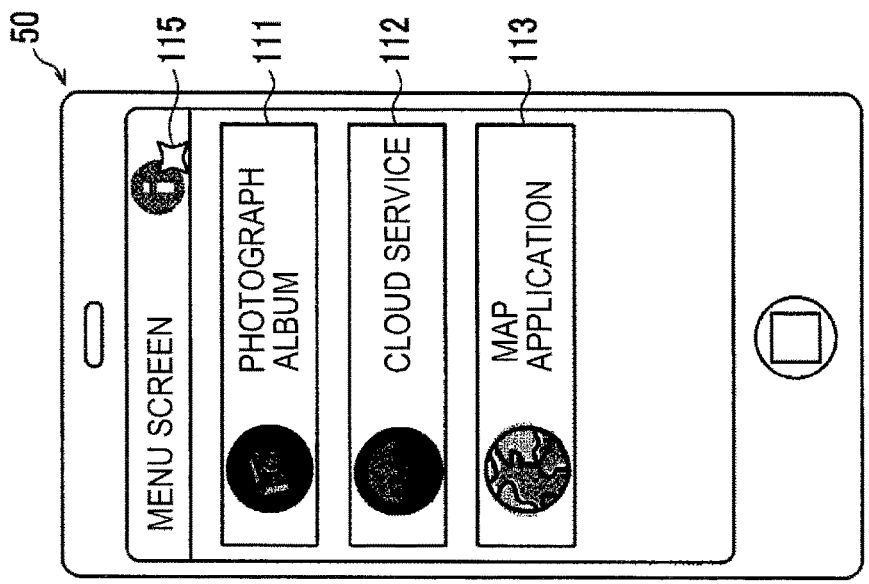

Then, the printing program 65 displays the menu screen on the display 53 (S40). FIG. 6 depicts an example of the menu screen. The menu screen shown in FIG. 6A includes a plurality of acquisition source icons 111, 112, 113 and a notification icon 115. The menu screen shown in FIG. 6B includes a plurality of acquisition source icons 111 to 114. The acquisition source icons 111 to 114 are icons indicative of methods of acquiring the print data. On the menu screen, a list of the acquisition source icons 111 to 114 is displayed, and the notification icon 115 is displayed at a position deviating from the area in which the list of the acquisition source icons 111 to 114 is displayed. The processing of step S40 is an example of the list display processing.

The acquisition source icon 111 is associated with processing of acquiring the photograph data stored in the photograph data folder of the data storage area 62B, as the print data. The acquisition source icon 111 is configured by combining an icon representing the photograph data folder and a character string "photograph album." The acquisition source icon 112 is associated with processing of acquiring the data stored in the service provision apparatus 70, as the print data. The acquisition source icon 112 is configured by combining an icon representing the service provision apparatus 70 and a character string "cloud service."

In the meantime, the correspondence relation between the acquisition source icons 111, 112 and the processing of acquiring the print data may be defined in the printing program 65, or a definition file in which the correspondence relation is defined may be read by the printing program 65. The definition file may be stored in the area of the data storage area 62B allotted to the printing program 65 from the OS 64 at the same timing or with the same method as each setting value shown in FIGS. 3A to 3C, for example.

The processing of acquiring the print data associated with the acquisition source icon is not limited to the above example. For instance, the printing program 65 may activate a camera (not shown) mounted to the mobile terminal 50, and acquire photograph data captured by the camera, as the print data. In another example, the printing program 65 may operate as a Web browser and acquire Web data provided by a Web server, as the print data. In another example, the printing program 65 may operate as an email client and acquire email data accumulated in an email server, as the print data. In another example, the printing program 65 may acquire hysteresis data registered in a clipboard of the mobile terminal 50, as the print data.

The acquisition source icon 113 is associated with processing of operating the map program 66 and acquiring the print data determined with the map program 66. The acquisition source icon 113 is configured by combining the first icon acquired from the map program 66 and an application name "map application" of the map program 66 shown in FIG. 2A. The acquisition source icon 114 is associated with processing of operating the paint program and acquiring the print data determined with the paint program. The acquisition source icon 114 is configured by combining the second icon of the paint program shown in FIG. 2A and an application name "image editing application" of the paint program.

The processing of acquiring the print data from the photograph data folder and the service provision apparatus 70 is implemented in advance in the printing program 65. That is, the menu screen always includes the acquisition source icons 111, 112. The acquisition source icons 111, 112 are examples of the basic icon. When the processing of acquiring the photograph data captured with the camera as the print data, the processing of acquiring the Web data provided by the Web server as the print data or the processing of acquiring the email data accumulated in the email server as the print data is implemented in the printing program 65, the acquisition source icon corresponding to the processing is included in the menu screen. The corresponding processing can be executed without calling the external program.

In the meantime, the processing of acquiring the print data determined with the map program 66 and the paint program can be used by the printing program 65 as the corresponding program is installed in the mobile terminal 50. That is, the menu screen that is displayed at a state where the map program 66 is installed and the paint program is not installed includes only the acquisition source icon 113 corresponding to the map program 66 installed in the mobile terminal 50, as shown in FIG. 6A. The acquisition source icons 113, 114 are examples of the external icon. The processing associated with the acquisition source icons 113, 114 is implemented in the external program, not the printing program 65. In other words, processing of handing over an activation argument to activate the external program and processing of acquiring a return value from the external program only have to be implemented in the printing program 65.

The printing program 65 stands by a state where the user's operation of selecting the acquisition source icons 111 to 114 or the notification icon 115 can be received through the user interface 54, with displaying the menu screen on the display 53 (S43). Then, when the user's operation of tapping a position of one of the icons 111 to 113, 115 is received through the user interface 54 (S43: Yes), the printing program 65 ends the menu screen display processing. The processing of step S43 is an example of the second reception processing. The user's operation of tapping one of the icons 111 to 113, 115 is an example of the second touch operation.

The printing program 65 stands by a state where a deletion notification can be received from the OS 64, while displaying the menu screen on the display 53. The deletion notification is a notification indicating that the external program has been deleted from the program storage area 62A, i.e., the external program has been uninstalled. The deletion notification includes the program ID of the uninstalled external program, for example. When the deletion notification is acquired from the OS 64 (S41: Yes), the printing program 65 sets the acquisition source icon to a non-display state, which corresponds to the external program identified by the program ID of the acquisition source icons 111 to 114 included in the menu screen (S42).

Returning to FIG. 4, when the user's operation of tapping one position of the acquisition source icons 111, 112 included in the menu screen (S12: the basic icon), the printing program 65 executes basic acquisition processing (S13). The basic acquisition processing is processing of enabling the user to designate one of the data acquirable from the acquisition source corresponding to the selected basic icon and acquiring the designated data as the print data. The basic acquisition processing is implemented in the printing program 65.

Figure 7A:
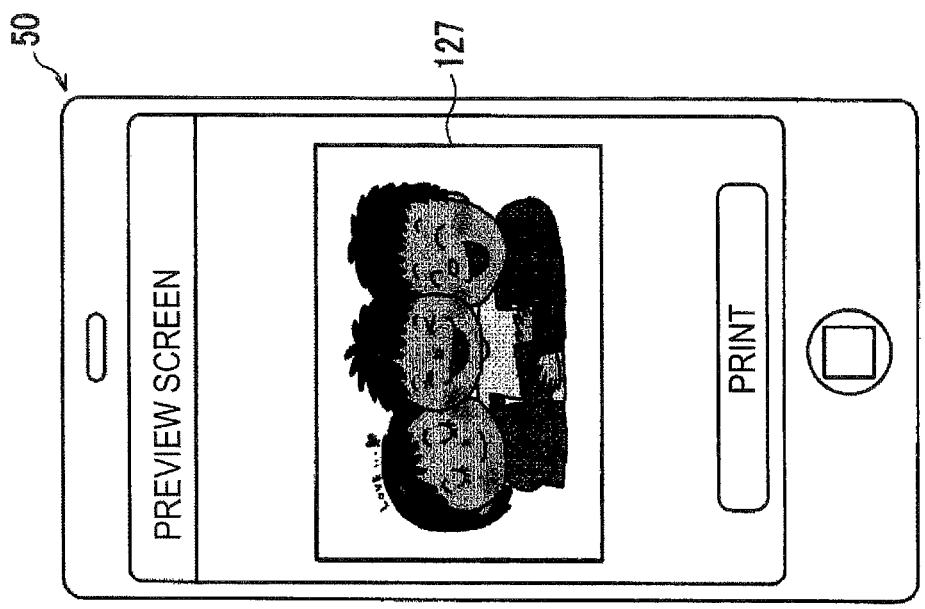

In the basic acquisition processing that is executed as the acquisition source icon 111 is selected, the printing program 65 displays a photograph data selection screen on the display 53. FIG. 7A depicts an example of the photograph data selection screen. The photograph data selection screen shown in FIG. 7A includes a plurality of photograph icons 121, 122, 123, 124, 125, 126. The photograph icons 121 to 126 correspond to the photograph data stored in the photograph data folder. The photograph icons 121 to 126 may be thumbnail images obtained by reducing sizes or resolutions of corresponding photograph images.

The printing program 65 stands by a state where the user's operation of selecting one of the photograph icons 121 to 126 can be received through the user interface 54, with displaying the photograph data selection screen on the display 53. For example, when the user's operation of tapping a position of the photograph icon 121 is received through the user interface 54, the printing program 65 acquires the photograph data corresponding to the photograph icon 121 from the photograph data folder, as the print data. Meanwhile, in the first illustrative embodiment, it is assumed that the format information of the photograph data is "PNG."

In the basic acquisition processing that is executed as the acquisition source icon 112 is selected, the printing program 65 displays a data selection screen on the display 53 so that the user is enabled to select the data stored in the service provision apparatus 70. Although the specific example of the data stored in the service provision apparatus 70 is not particularly limited, the document data, the image data, the text data and the like may be exemplified. FIG. 8A depicts an example of the data selection screen. The data selection screen shown in FIG. 8A includes a plurality of data icons 131, 132, 133. The data icons 131 to 133 correspond to the data stored in the service provision apparatus 70.

The printing program 65 stands by a state where the user's operation of selecting one of the data icons 131 to 133 can be received through the user interface 54, with displaying the data selection screen on the display 53. For example, when the user's operation of tapping a position of the data icon 131 is received through the user interface 54, the printing program 65 receives the PDF data "recipe.pdf" corresponding to the data icon 131 from the service provision apparatus 70 through the network interface 55, as the print data.

In the meantime, when print data of a data format that is not supported is received, the printing program 65 may cause the server apparatus (not shown) to convert the data format of the print data. For example, the printing program 65 transmits conversion instruction information, which includes print data of a first format, to the server apparatus through the network interface 55, and receives print data converted into a second format different from the first format from the server apparatus through the network interface 55. The first format indicates format information of print data with which the printing program 65 cannot generate a preview image. The second format indicates format information of print data with which the printing program 65 can generate a preview image.

When the user's operation of tapping a position of the acquisition source icon 113 is received through the user interface 54 (S12: the external icon), the printing program 65 executes external acquisition processing (S14). The external acquisition processing is processing of acquiring the print data determined with the external program. That is, the printing program 65 operates the map program 66 corresponding to the acquisition source icon 113, and acquires the print data determined with the map program 66. In the meantime, the printing program 65 may operate the map program 66 through a plug-in manner or the OS 64.

In the meantime, the printing program 65 may hand over the map program 66 by using the setting value list shown in FIG. 2B as an activation argument, for example. In the meantime, when a plurality of setting value lists is stored in the data storage area 62B of FIG. 2B, the printing program 65 may set a setting value list of the default printer as an activation argument, or may set a setting value list associated with the program ID of the map program 66 as an activation argument. However, the specific example of the activation argument is not limited thereto and may be the list of the setting value IDs shown in FIG. 3C, for example. While the map program 66 is being executed, the printing program 65 may be retreated to the background or may be over.

The map program 66 executed by the printing program 65 displays a printing area determination screen on the display 53. FIG. 9A depicts an example of the printing area determination screen. The printing area determination screen shown in FIG. 9A includes a map display area 141 and a [preview] icon. The map program 66 stands by at a state where the user's operation on the map display area 141 and the [preview] icon can be received through the user interface 54.

In the map display area 141, a part of a map image capable of displaying the map program 66 is displayed. In the map display area 141 upon the activation of the map program 66, a map image 142 including a current position of the mobile terminal 50 acquired from a GPS (abbreviation of Global Positioning System) is displayed. The map program 66 acquires map image data, which represents the map image 142 of a display target, from the server apparatus (not shown) through the network interface 55.

When the user's operation on a position of the map display area 141 is received through the user interface 54, the map program 66 changes the map image 142 that is to be displayed in the map display area 141. The map image 142 that is to be displayed in the map display area 141 is slid according to a slide operation, is reduced according to a pinch-in operation and is expanded according to a pinch-out operation, for example. In addition, the map program 66 may receive the user's operation of instructing rotation of the map image or setting of a landmark icon and reflect the same on the map image 142 included in the map display area 141.

When the user's operation of tapping a position of the [preview] icon is received through the user interface 54, the map program 66 stores the map image data, which represents the map image 142 displayed in the map display area 141, in the data storage area 62B, as the print data. Meanwhile, in the first illustrative embodiment, it is assumed that the format information of the map image data is "PNG". The map program 66 notifies the printing program 65 of the program ID "001" of the map program and the file name of the print data stored in the data storage area 62B, as the return value, and is over. The file name of the print data is an example of the data identifying information. The processing of notifying the program ID and the like is an example of the notification processing.

In the meantime, the information to be handed over to the printing program 65 as the return value is not limited to the above example. For instance, the map program 66 may include the designated setting value, which is a setting value to be used in the recording processing of the print data, in the return value. The designated setting value may be selected from the setting value list acquired as the activation argument by the map program 66 or the user, for example. In another example, the map program 66 may include a setting value ID of the designated setting value to be used in the recording processing of the print data, in the return value. The setting value ID may be selected from the setting value IDs acquired as the activation argument by the map program 66 or the user, for example.

Although not shown, when the user's operation of tapping a position of the notification icon 115 is received through the user interface 54, the printing program 65 displays a screen, which urges the user to install an external program not installed yet, on the display 53. For example, when the user's operation of instructing an install of a paint program is received through the user interface 54, the printing program 65 installs the paint program into the mobile terminal 50, and displays a menu screen shown in FIG. 6B on the display 53. The menu screen shown in FIG. 6B is different from the menu screen shown in FIG. 6A, in that the acquisition source icon 114 corresponding to the paint program is displayed and the notification icon 115 is set to a non-display state.

Then, the printing program 65 specifies the setting value that is to be used in the recording processing of the acquired print data (S15, S18). The printing program 65 generates a preview image of the print data according to the specified setting value, and displays the preview screen on the display 53 (S16, S17, S19). Then, the printing program 65 stands by at a state where the user's operation of tapping a position of a [print] icon included in the preview screen can be received through the user interface 54, with displaying the preview screen on the display 53 (S20).

The preview image included in the preview screen is an image representing a state where a print image represented by the print data is recorded on the sheet. The user's operation of tapping a position of the [print] icon included in the preview screen is an example of the first touch operation of instructing execution of the recording processing of the print data. The processing of steps S15 to S19 is an example of the preview display processing, and the processing of step S20 is an example of the first reception processing.

In the first illustrative embodiment, after the basic acquisition processing is performed in S13, in S22, the printing program 65 generates the preview image of the print data according to the second setting value, and displays the preview screen on the display 53 in the same manner as in S17. For example, when the photograph data corresponding to the photograph icon 121 is acquired as the print data, the printing program 65 generates a preview image 127 of the photograph data according to the second setting value corresponding to the format information "PNG". In another example, when the PDF data corresponding to the data icon 131 is acquired as the print data, the printing program 65 generates a preview image 134 of the PDF data according to the second setting value corresponding to the format information "PDF".

Figure 7B:
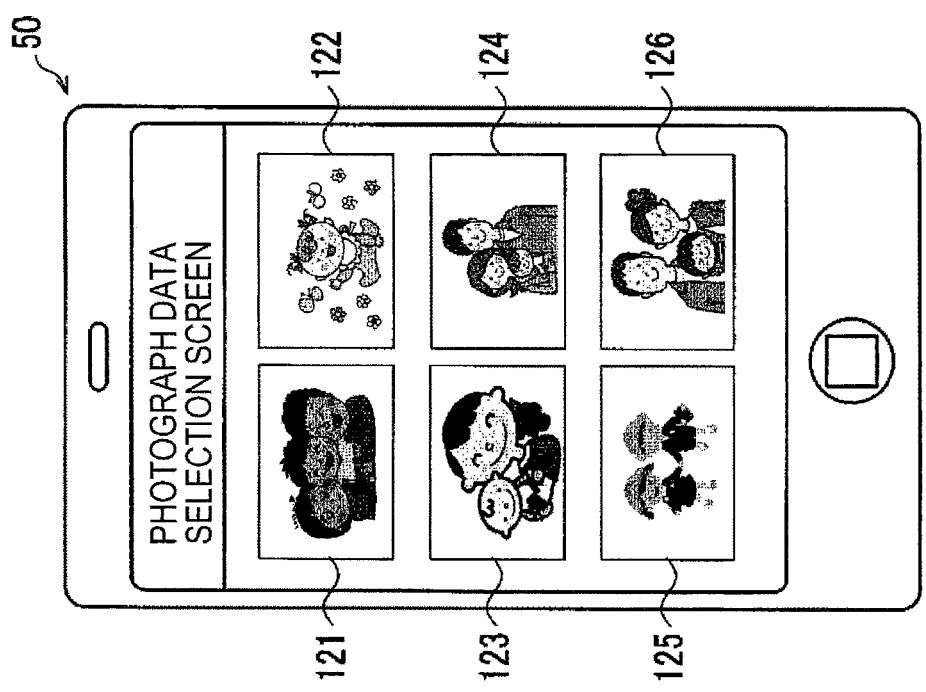

FIG. 7B depicts a preview screen of the photograph data corresponding to the photograph icon 121. The preview image 127 included in the preview screen of FIG. 7B represents a state where the photograph corresponding to the photograph icon 121 is printed on a glossy sheet having an L size in full colors without an edge. FIG. 8B depicts a preview screen of the PDF data corresponding to the data icon 131. The preview image 134 included in the preview screen of FIG. 8B represents a state where an image represented by the PDF data is printed on a normal sheet having an A4 size in 256 colors.

Here, when the print data consists of a plurality of pages, the printing program 65 generates preview images 135, 136 corresponding to the plurality of pages, respectively, and displays a list of the preview images, as shown in FIG. 8B. In the meantime, when page break information, which represents a border position of a first page and a second page, is included in the print data, the printing program 65 may generate the preview images 135, 136 according to the page break information. On the other hand, when the page break information is not included in the print data, the printing program 65 may determine a border position of the pages based on a corresponding sheet size or a number of lines to be included in one page.

When the external acquisition processing is executed, the printing program 65 acquires at least the file name of the print data and the program ID of the external program, as the return value. The printing program 65 may further acquire the designated setting value or the setting value ID, as the return value. Then, the printing program 65 acquires the print data specified by the acquired file name from the data storage area 62B. The printing program 65 of the first illustrative embodiment acquires the map image data generated by the map program 66.

Then, when the designated setting value is included in the return value (S18: Yes), the printing program 65 generates a preview image 143 of the map image data according to the designated setting value. When the setting value ID is included in the return value (S18: Yes), the printing program 65 reads out the designated setting value corresponding to the setting value ID from the data storage area 62B, and generates a preview image 143 of the map image data according to the read designated setting value. The processing of reading out the designated setting value is an example of the readout processing.

On the other hand, when the designated setting value or the setting value ID is not included in the return value and the first setting value of the map program 66 is stored in the data storage area 62B shown in FIG. 3A (S18: No&S15: Yes), the printing program 65 reads out the first setting value from the data storage area 62B, and generates a preview image 143 of the map image data according to the read first setting value. On the other hand, when the first setting value of the map program 66 is not stored in the data storage area 62B (S15: No), the printing program 65 reads out the second setting value corresponding to the format information "PNG" from the data storage area 62B, and generates a preview image 143 of the map image data according to the read second setting value. The processing of reading out the first setting value or the second setting value is another example of the readout processing.

FIG. 9B depicts a preview screen of the map image data representing the map image 142 shown in FIG. 9A. In the example of FIG. 9B, it is assumed that the first setting value associated with the program ID "001" is used. That is, the preview image 143 shown in FIG. 9B represents a state where the map image 142 represented by the map image data is printed on an A4 normal sheet 144 in 256 colors.

Then, when the user's operation of tapping a position of the [print] icon is received through the user interface 54 (S20: Yes), the printing program 65 transmits recording instruction information to the complex machine 10 through the network interface 55 (S21). The recording instruction information is information for causing the complex machine 10 to execute the recording processing of the print data according to the setting value used for generation of the preview image. The recording instruction information includes the print data acquired in steps S13, S14 and the setting value used for generation of the preview image, for example. The processing of step S21 is an example of the output processing.

When the recording instruction information is received from the mobile terminal 50 through the network interface 25, the control program 35 of the complex machine 10 causes the printer unit 11 to execute the recording processing represented by the recording instruction information. That is, the printer unit 11 executes the recording processing of the print data included in the recording instruction information according to the setting value included in the recording instruction information.

Operational Effects of First Illustrative Embodiment

When the print data is acquired from the photograph data folder or the service provision apparatus 70, the user may be enabled to select one of the icons in the list, as described in FIG. 7A or 8A. In the meantime, when the map image data representing a desired map image is acquired as the print data, a variety of user's operations on the map display area 141 may be received, as described in FIG. 9A. That is, the interface appropriate to the selection of the print data is largely different depending on the type of the data.

Therefore, like the first illustrative embodiment, it is possible to provide the interface appropriate to the selection of the print data without largely modifying the printing program 65 by calling the external program from the printing program 65, even though the types of the print data to be supported increase. In particular, when the activation argument to be handed over to the external program, the return value to be acquired from the external program and the like are published in advance, it is possible to promote the development of the external program having an interface appropriate to selection of a new type of print data.

In the menu screen of the first illustrative embodiment, only the external icon indicating the external program already installed is shown and the external icon indicating the external program not installed yet is not shown. The external icon indicating the external program uninstalled during the display of the menu screen is set to a non-display state. As a result, the user can easily find out a desired acquisition source icon from the acquisition source icons listed in the menu screen.

The menu screen of the first illustrative embodiment can enable the user to recognize that there is the installable external program by the notification icon 115. As a result, it is possible to provide the interface appropriate to the selection of the print data. Further, the notification icon 115 is arranged at the position deviating from the area, in which the acquisition source icons 111 to 114 are listed, in the menu screen. Therefore, the effect that the user can easily find out the desired acquisition source icon is not deteriorated.

According to the first illustrative embodiment, it is possible to execute the recording processing of the print data, which is selected by the user through the external program, according to the designated setting value designated by the user through the external program or the first setting value optimized for each external program. Further, even when the designated setting value is not designated and the first setting value is not stored, it is possible to execute the recording processing according to the setting value optimized for each data format of the print data. For example, although both the photograph data described in FIG. 7 and the map image data described in FIG. 9 have the "PNG" format, the setting value appropriate to each data is applied.

The setting value that is to be stored in the data storage area 62B is not limited to the example of FIG. 3. For example, the first setting value that is to be used in the recording processing of recording an image only on one page and the second setting value that is to be used in the recording processing of recording images on a plurality of pages may be stored in the data storage area 62B. When the print data includes only an image that is to be recorded on one page, the printing program 65 may display the preview image generated according to the first setting value on the display 53. On the other hand, when the print data includes images that are to be recorded on a plurality of pages, the printing program 65 may display the preview image generated according to the second setting value on the display 53.

The external program of the first illustrative embodiment can customize the interface for selecting the print data according to the functions of the complex machine 10, based on the setting value list acquired from the printing program 65. As a result, it is possible to provide the interface more appropriate to the selection of the print data.

Figure 10:
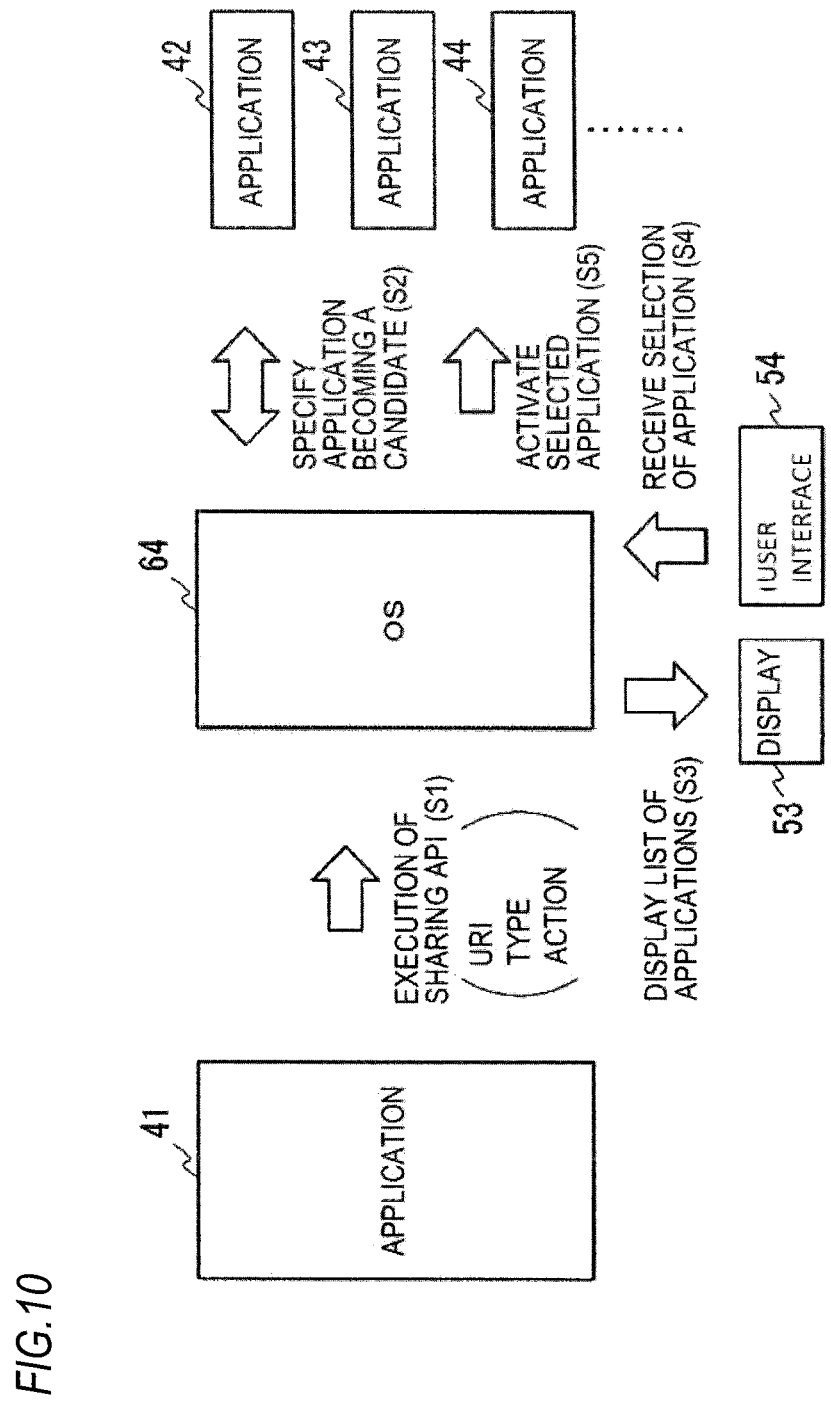
FIG. 10 depicts a sharing function that is to be implemented by a sharing API.

In the first illustrative embodiment, the example where the printing program 65 activates the map program 66 in the plug-in manner has been described. However, the method of calling the map program 66 from the printing program 65 is not limited to the above example. For example, as shown in FIG. 10, it is possible to call the map program 66 from the printing program 65 by a sharing function that is to be implemented by an API provided by the OS 64 of the mobile terminal 50.

First, an application 41 of a sharing source executes an API of the OS 64 (hereinafter, referred to as 'sharing API') for implementing the sharing function (S1). When executing the sharing API, a URI (abbreviation of Uniform Resource Identifier), a type and an action are required as an input argument. The URI is information indicating a location of sharing data. The type is information indicating a data format of sharing data. The action is information indicating a type of processing (for example, browsing, editing, transmitting, printing and the like) of sharing data that is to be executed by an application of a sharing destination.

In the meantime, applications 42, 43, 44, . . . , which are candidates of the application of a sharing destination, declare in advance a data format of sharing data that can be processed and a type of processing that can be executed for the OS 64. Therefore, the OS 64 specifies applications, which can execute processing (represented by the action) for sharing data of a data format represented by the type, from the applications 42, 43, 44, . . . (S2), and displays a list of the specified applications on the display 53 (S3). Then, the OS 64 stands by at a state where the user's operation of selecting one of the listed applications can be received through the user interface 54 (S4).

Then, when the user's operation of selecting one of the listed applications is received through the user interface 54 (S4), the OS 64 activates the corresponding application by using the URI, the type and the action as the activation argument (S5). Meanwhile, in the example of FIG. 10, the application 41 corresponds to the printing program 65, and the applications 42 to 44 correspond to the external program. The information handed over between the printing program 65 and the map program 66 may be described in the URI.

Second Illustrative Embodiment

The external program not only may be called and activated from the printing program 65 but also may be independently activated according to a user's instruction to the OS 64. The image recording processing of a second illustrative embodiment is described with reference to FIG. 11. In the meantime, the descriptions of the common points to the first illustrative embodiment are omitted and the differences are mainly described. The image recording processing of the second illustrative embodiment is different from the first illustrative embodiment, in that the map program 66 independently executed calls the printing program 65 as the plug-in.

When the map program 66 of the second illustrative embodiment is activated by the user, the map program 66 displays the printing area determination screen shown in FIG. 9A on the display 53. Then, when the user's operation of tapping a position of the [preview] icon is received through the user interface 54, the map program 66 activates the printing program 65 of the second illustrative embodiment as the plug-in. In the meantime, the map program 66 hands over the program ID "001" of the map program 66 and the file name of the print data stored in the data storage area 62B to the printing program 65, as the activation argument. The activation argument may include the designated setting value or the setting value ID, too.

Figure 11:
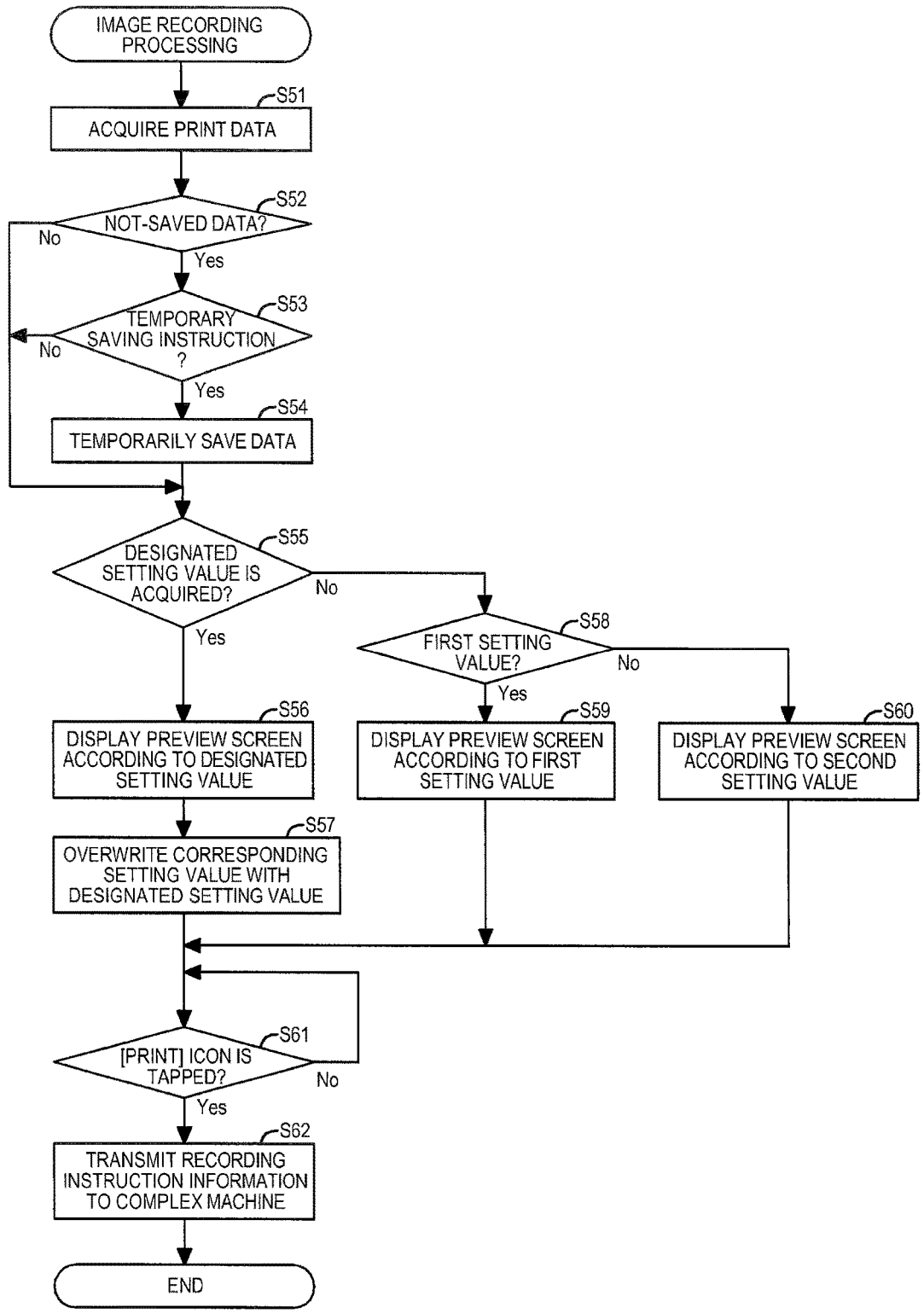
FIG. 11 is a flowchart of the image recording processing according to a second illustrative embodiment.

The printing program 65 activated by the map program 66 executes the image recording processing shown in FIG. 11. In the meantime, processing of steps S52 to S54 is described later. First, the printing program 65 acquires the print data, based on the activation argument acquired from the map program 66 (S51). Then, the printing program 65 generates a preview image of the print data according to the designated setting value, the first setting value or the second setting value, and displays a preview screen including the preview image on the display 53 (S55 to S60). Since the processing of steps S55 to S60 is common to the processing of steps S18, S19 and S15 to S17 of FIG. 4, the overlapping descriptions are omitted.

The printing program 65 of the second illustrative embodiment stores the designated setting value used for generation of the preview image in step S56 in the data storage area 62B shown in FIG. 2A, as the first setting value of the map program 66 (S57). That is, when the designated setting value or the setting value ID is acquired from the external program as the return value, the printing program 65 overwrites the first setting value of the external program with the designated setting value. At this time, like the first illustrative embodiment, the processing of step S57 may be omitted.

Then, when the user's operation of tapping a position of the [print] icon included in the preview screen is received through the user interface 54 (S61: Yes), the printing program 65 transmits the recording instruction information to the complex machine 10 through the network interface 55 (S62). Since the processing of steps S61 and S62 is common to steps S20 and S21 of FIG. 4, the overlapping descriptions are omitted. Since the processing of the complex machine 10 having received the recording instruction information is also common to the first illustrative embodiment, the overlapping descriptions are omitted.

In the meantime, when the OS 64 of the mobile terminal 50 has a multitask function, the processing of steps S52 to S54 may be executed. For example, the user of the mobile terminal 50 can retreat the printing program 65 of displaying the preview screen on the display 53 into the background, activate the map program 66 and tap a position of the [preview] icon. At this time, the printing program 65 called as the plug-in of the map program 66 executes the image recording processing shown in FIG. 11.

The preview image included in the preview screen, which is displayed before the printing program 65 is retreated to the background, is an example of the first preview image. The print data used for generation of the first preview image is an example of the first print data. The print data, which is called and acquired from the map program 66 during the display of the first preview image, is an example of the second print data.

Figure 12A:
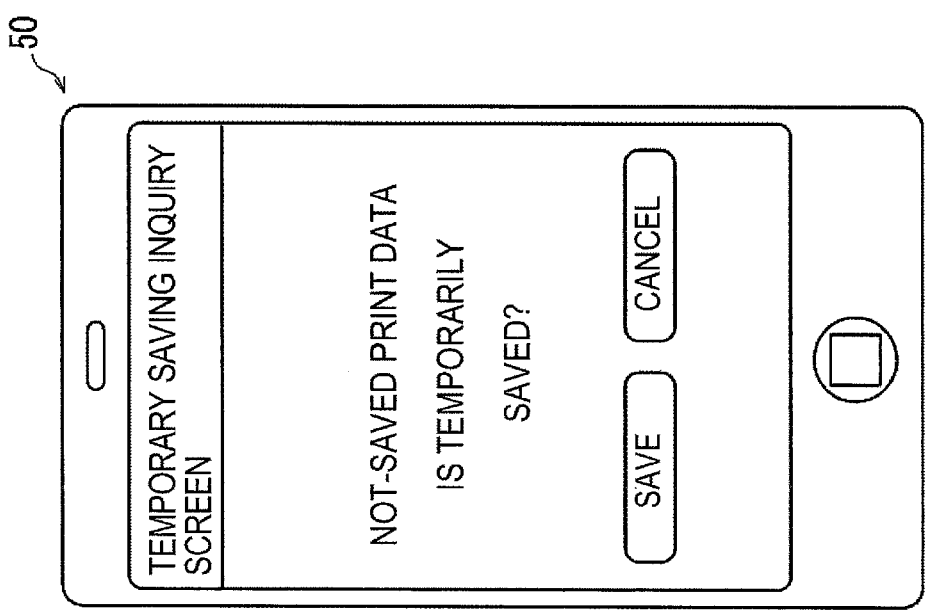

In this case, the printing program 65 determines that the first print data is not saved yet (S52: Yes) and displays a temporary saving inquiry screen on the display 53 (S53). FIG. 12A is an example of the temporary saving inquiry screen. The temporary saving inquiry screen shown in FIG. 12A includes a message 'Not-saved print data is temporarily saved?', a [save] icon and a [cancel] icon. Then, the printing program 65 stands by at a state where the user's operation on the temporary saving inquiry screen can be received through the user interface 54.

When the user's operation of tapping a position of the [save] icon is received through the user interface 54 (S53: Yes), the printing program 65 temporarily stores the first print data in a predetermined area of the data storage area 62B (S54). On the other hand, when the user's operation of tapping a position of the [cancel] icon is received through the user interface 54 (S53: No), the printing program 65 skips over the processing of step S54. That is, the first print data is deleted. The processing of step S53 is an example of the inquiry processing, and the processing of step S54 is an example of the storage control processing.

Then, the printing program 65 executes the processing of step S55 and thereafter. That is, the printing program 65 displays the preview screen, which includes the second preview image generated based on the second print data, on the display 53 (S55 to S60), and instructs the complex machine 10 to execute the recording processing of the second print data (S61, S62). Although not shown, after the recording processing of the second print data is over, the printing program 65 may generate a first preview image based on the temporarily stored first print data and display a first preview screen including the first preview image on the display 53.

Operational Effects of Second Illustrative Embodiment

According to the second illustrative embodiment, it is possible to the not-saved first print data from being erroneously deleted even though the map program 66 is called during the execution of the preview display processing, in addition to the operational effect that the preview display processing and the recording processing can be executed according to the appropriate setting value. The user is inquired whether or not to temporarily store the first print data. Thereby, it is possible to suppress the unnecessary first print data from being temporarily stored.

In the meantime, when the first print data is acquired from the service provision apparatus 70 through the network interface 55, when the first print data is edited by the external program or when the first print data is converted by the server apparatus (not shown), for example, the printing program 65 may execute the processing of steps S52 to S54. In the meantime, the printing program 65 may skip over the processing of steps S52 to S54 when the first print data does not meet the above conditions.

According to the above configuration, it is not necessary to again execute the processing of receiving the first print data from the service provision apparatus 70, the processing of causing the external program to edit the first print data or the processing of causing the server apparatus (not shown) to convert the first print data. In step S54, the data to be temporarily stored is not limited to the first print data. That is, the setting value used for generation of the first preview image may be further temporarily stored, and the image data representing the first preview image may be temporarily stored instead of the first print data.

In the meantime, the processing of steps S52 to S54 may also be applied to processing, in addition to the processing of temporarily storing the not-saved print data. For example, as described in detail later, the printing program 65 may further have functions of acquiring scan data generated with the scanner unit 12 of the complex machine 10 from the complex machine 10 and storing the scan data in a location designated by the user. The printing program 65 may temporarily store the not-saved scan data in the processing of steps S52 to S54.

Figure 12B:
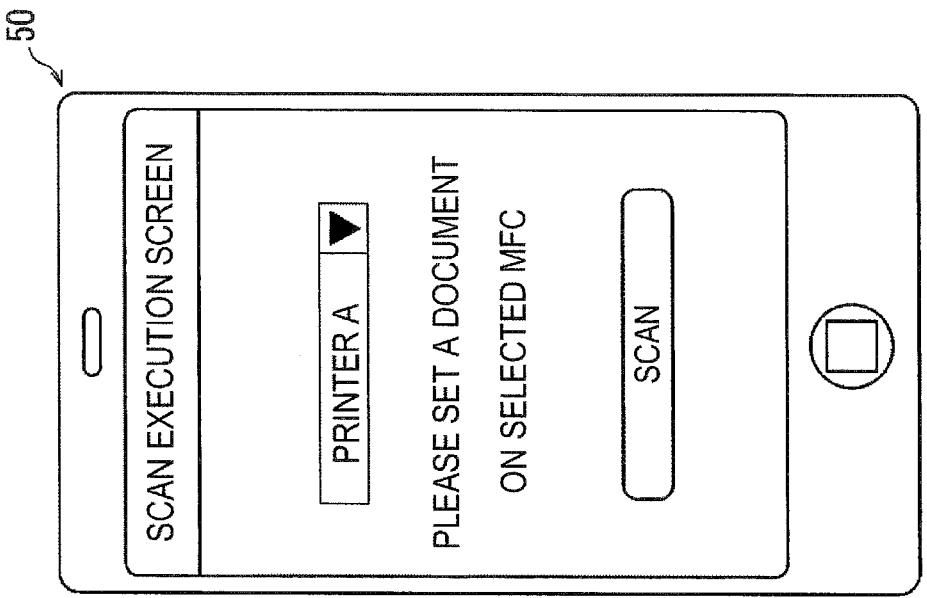

First, the printing program 65 displays a scan execution screen on the display 53. FIG. 12B depicts an example of the scan execution screen. The scan execution screen shown in FIG. 12B includes a pull-down menu for receiving a selection of the complex machine 10 to execute the scan processing, a message 'Please set a document on selected MFC' and a [scan] icon. Then, the printing program 65 stands by at a state where the user's operation on the scan execution screen can be received through the user interface 54.

Then, when the user's operation of tapping a position of the [scan] icon is received through the user interface 54, the printing program 65 transmits scan instruction information, which instructs execution of the scan processing, to the complex machine 10 selected through the pull-down menu, through the network interface 55. Then, the printing program 65 stands by at a state where the scan data generated by the complex machine 10 can be received through the network interface 55. The corresponding processing is an example of the reception processing.

When the scan instruction information is received from the mobile terminal 50 through the network interface 25, the control program 35 of the complex machine 10 causes the scanner unit 12 to read a document set on a contact glass or ADF (abbreviation of Auto Document Feeder) and transmits the scan data generated by the scanner unit 12 to the mobile terminal 50 through the network interface 25. The corresponding processing is an example of the reading processing.

Figure 13B:
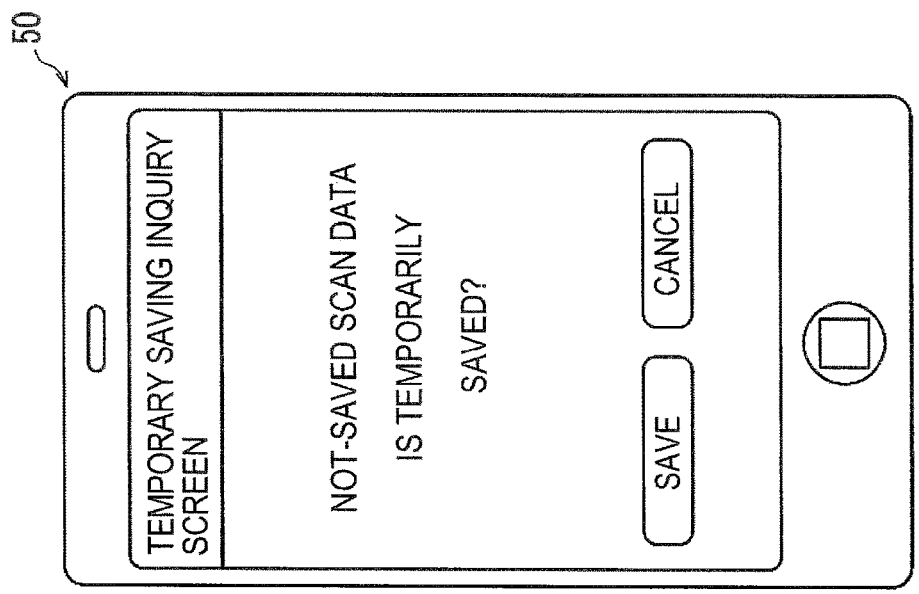
Figure 13A:
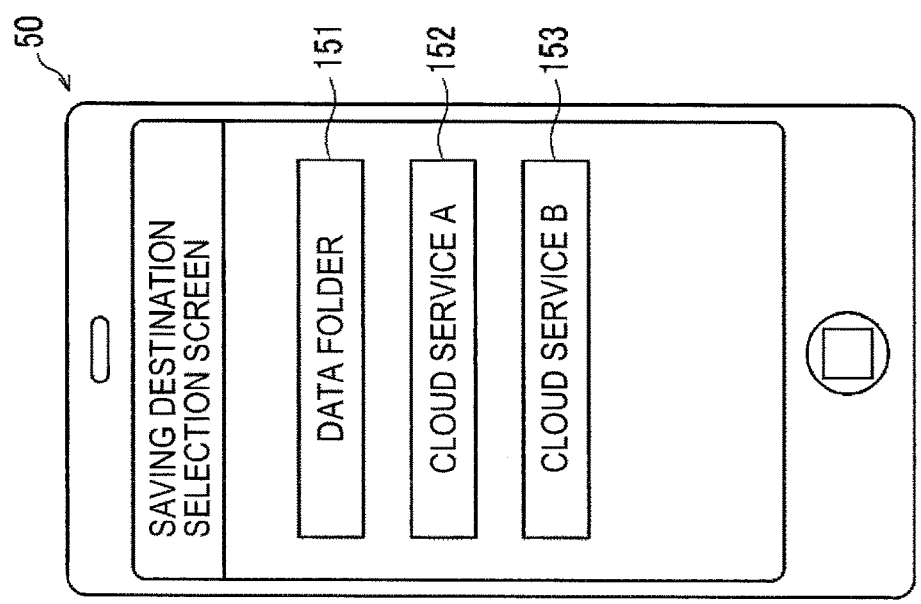

Then, when the scan data is received from the complex machine 10 through the network interface 55, the printing program 65 displays a saving destination selection screen on the display 53. FIG. 13A depicts an example of the saving destination selection screen. The saving destination selection screen shown in FIG. 13A includes one or more saving destination icons 151, 152, 153. The saving destination icons 151 to 153 correspond to saving destinations of the scan data. For example, the saving destination icon 151 corresponds to the data folder provided for the data storage area 62B. Also, the saving destination icons 152, 153 correspond to the storage servers such as the service provision apparatus 70. Then, the printing program 65 stands by at a state where the user's operation on the saving destination selection screen can be received through the user interface 54. The corresponding processing is an example of the reception processing.

Then, when the user's operation of tapping a position of one of the saving destination icons 151 to 153 is received through the user interface 54, the printing program 65 stores the scan data in the saving destination corresponding to the saving destination icon. In the meantime, when the printing program 65 displaying the scan execution screen or the saving destination selection screen is retreated to the background and is called as the plug-in of the map program 66, the printing program 65 executes the image recording processing shown in FIG. 11.

In this case, the printing program 65 determines that the scan data is not saved yet (S52: Yes) and displays a temporary saving inquiry screen shown in FIG. 13B on the display 53 (S53). When the user's operation of tapping a position of the [save] icon is received through the user interface 54 (S53: Yes), the printing program 65 temporarily stores the scan data in the data storage area 62B (S54). On the other hand, when the user's operation of tapping a position of the [cancel] icon is received through the user interface 54 (S53: No), the printing program 65 skips over the processing of step S54. Thereby, it is not necessary to cause the complex machine 10 to again execute the scan processing.

In the meantime, in the complex machine 10 and the mobile terminal 50 of the respective illustrative embodiments, the various programs stored in the program storage areas 32A, 62A of the storages 32, 62 are executed by the CPUs 31, 61, so that the respective processing, which is to be executed by the control unit of the disclosure, is implemented. However, the configuration of the control unit is not limited thereto and a part or all of the control unit may be implemented by the hardware such as an IC (abbreviation of Integrated Circuit).

Further, the disclosure can be implemented as not only the complex machine 10 or the mobile terminal 50 but also a program for causing the complex machine 10 or the mobile terminal 50 to execute the processing. The program may be recorded and provided in a non-transitory recording medium. The non-transitory may include a CD-ROM, a DVD-ROM, and a storage mounted on a server apparatus that can be connected to the complex machine 10 or the mobile terminal 50 through the communication network 102. The program stored in the storage of the server apparatus may be delivered through the communication network 102 such as the Internet, as the information or signals representing the program.

Incidentally, in the above description, a term "icon" represents an image to be displayed, and a term "icon data" is data representing the icon, and is an example of object data. As a matter of convenience, "icon" and "icon data" may be used without distinction in the embodiment.

What is claimed is:

1. A non-transitory computer readable recording medium storing a printing program configured to be executed by a computer comprising a display, a user interface, a storage configured to store an external program which is installed in the computer and a network interface, the printing program, when the printing program which is installed in the computer is executed by the computer, the printing program causing the computer to execute: first user interface displaying process of displaying, on the display a first user interface which allows a user to select a first type of print data, when the external program is executed by the computer, the external program causing the computer to execute second user interface displaying process of displaying, on the display, a second user interface which allows the user to select a second type of print data different from the first type of print data, when the printing program which is installed in the computer is executed by the computer, causing the computer to execute:

third user interface displaying process of display, on the display, a third user interface which allows the user to select an activation of the external program;

external program executing processing of executing the external program when the user selects the activation of the external program through the third user interface, after the external program is activated, external acquisition processing of acquiring the second type of the print data selected by the user through the second user interface;

preview display processing of displaying a preview image on the display, the preview image representing a state where a print image represented by one of the first type of the print data selected by the user through the first user interface and the second type of the print data acquired in the external acquisition processing is recorded on a sheet according to the specified setting value, by an image recording apparatus which is configured to perform wireless communication with the network interface;

first reception processing of receiving a first touch operation through the user interface at a state where the preview image is displayed on the display, the first touch operation instructing execution of the recording processing of the print data user interface; and output processing of, when the first touch operation is received in the first reception processing, transmitting recording instruction information to the image recording apparatus through the network interface, recording instruction information instructing the image recording apparatus to execute the recording processing of the print data.

2. The non-transitory computer readable recording medium according to claim 1, wherein the printing program causes the computer to execute:
list display processing of displaying, on the display, a basic object and an external object, the external object representing the external program stored in the storage in the third user interface displaying process;
in a state that the third user interface is displayed on the display, second reception processing of receiving, through the user interface, a second touch operation of selecting one of the basic object and the external object which are displayed on the display in the list display processing;
basic acquisition processing of, when the second touch operation of selecting the basic object is received in the second reception processing, receiving, through the user interface, a designation operation of designating data which can be acquired from an acquisition source and acquiring, as the first type of the print data which is acquired through the first user interface, the data designated in the designation operation from the acquisition source without intervention of the external program, and
the external acquisition processing by using the external program represented by the external object when the second touch operation of selecting the external object is received in the second reception processing.

3. The non-transitory computer readable recording medium according to claim 2, wherein
the printing program is causes the computer to execute determination processing of determining whether the external program is stored in the storage, and
in the list display processing, only an external object of a specific external program which is determined to be stored in the storage in the determination processing is displayed on the display as the external object.

4. The non-transitory computer readable recording medium according to claim 3, wherein
the printing program causes the computer to execute identification information acquisition processing of acquiring a plurality of program identifying information for identifying each of the external programs that can be executed in the external acquisition processing, and
in the determination processing, it is determined whether the external program identified by the program identifying information is stored in the storage.

5. The non-transitory computer readable recording medium according to claim 3, wherein
the printing program causes the computer to execute:
object acquisition processing of attempting to acquire first object data from the specific external program, the object data representing a first object;
display the first object on the display, as the external object, in the list display processing when the first object data is acquired in the object acquisition processing, and
the first object represents the specific external program.

6. The non-transitory computer readable recording medium according to claim 5, wherein
second object data representing a second object for distinguishing one of the external programs from another external program is stored in the storage,
third object data representing a third object for distinguishing the external programs from the basic object is stored in the storage, and
the printing program causes the computer to display one of the second object and the third object on the display, as the external object, in the list display processing.

7. The non-transitory computer readable recording medium according to claim 6, wherein
when the first object data is acquired in the object acquisition processing, the printing program causes the computer to display the first object on the display, as the external object, in the list display processing, and
when the first object data cannot be acquired in the object acquisition processing, the printing program causes the computer to display one of the second object and the third object on the display, as the external object, in the list display processing.

8. The non-transitory computer readable recording medium according to claim 7, wherein the second object data and the third object data are stored in the storage when the printing instruction is installed in the computer or when the printing instruction is updated.

9. The non-transitory computer readable recording medium according to claim 3, wherein
the external object is provided to an area of the storage allotted to the external program when the external program is installed in the computer, and
the printing program reads out the external object from the storage from an area of the storage allotted to the external program.

10. The non-transitory computer readable recording medium according to claim 3, wherein when it is notified from an OS (Operation System) of the computer that the external program is deleted from the storage, the printing program causes the computer to set the external object, which represents the specific external program, to a non-display state in the list display processing.

11. The non-transitory computer readable recording medium according to claim 3, wherein when it is determined in the determination processing that the external program is not stored in the storage, the printing program causes the computer to display a notification object, which notifies that there is the external program capable of being installed in the computer, on the display in the list display processing.

12. The non-transitory computer readable recording medium according to claim 1,
wherein the printing program causes the computer to execute:
the external acquisition processing of acquiring program identifying information of the executed external program from the external program, the identifying information identifying the external program that can be executed in the external acquisition processing;
readout processing of, when the first setting value associated with the acquired program identifying information is stored in the storage, reading out the first setting value from the storage;
the preview display processing of displaying the preview image, which is generated according to the first setting value read out in the readout processing, on the display, and
the output processing of transmitting, to the image recording apparatus through the network interface, the recording instruction information for executing the recording processing of the second type of the print data according to the first setting value used for generation of the preview image.

13. The non-transitory computer readable recording medium according to claim 12, wherein in the preview display processing that is executed when a designated setting value, which is the setting value to be used in the recording processing of the second type of the print data, is acquired from the external program, the printing program displays the preview image generated according to the designated setting value on the display, regardless of whether the first setting value is stored in the storage.

14. The non-transitory computer readable recording medium according to claim 13, wherein the printing program causes the computer to store the designated setting value in the storage as the first setting value.

15. A non-transitory computer readable recording medium storing an external program that is to be executed by the computer with an instruction from the printing program according to claim 1,
wherein when the user interface receives a touch operation of designating the second type of the print data, the external program causes the computer to execute notification processing of notifying the printing program of data identifying information representing the second type of the print data.

16. The non-transitory computer readable recording medium according to claim 1, wherein the printing program is called by the external program as a plug-in.

17. The non-transitory computer readable recording medium according to claim 1, wherein the printing program is activated by the external program through an Operating System (OS).

18. The non-transitory computer readable recording medium according to claim 1, wherein
wherein the printing program causes the computer to execute:
notifying process of activating the external program and notifying, of the external program, a selectable range of the setting values to be used in the output processing;
after notifying the selectable range of the setting values, setting value acquiring process of acquiring, from the external program, the setting value selected from the selectable range by the external program as the specified setting value.

19. An information processing apparatus comprising:
a display;
a user interface;
a storage configured to store an external program and a printing program which are independently installed in the information processing apparatus;
a network interface; and
a processor configured to execute the external program and the printing program, when the printing program which is installed in the computer is executed by the computer, the printing program causing the computer to execute first user interface displaying process of displaying, on the display a first user interface which allows a user to select a first type of print data, when the external program is executed by the computer, the external program causing the computer to execute second user interface displaying process of displaying, on the display, a second user interface which allows the user to select a second type of print data different from the first type of print data,
wherein the printing program when executed by the processor, causes the information processing apparatus to execute:
third user interface displaying process of display, on the display, a third user interface which allows the user to select an activation of the external program;
external program executing processing of executing the external program when the user selects the activation of the external program through the third user interface;
after the external program is activated, external acquisition processing of acquiring the second type of the print data selected by the user through the second user interface;
preview display processing of displaying a preview image on the display, the preview image representing a state where a print image represented by one of the first type of the print data selected by the user through the first user interface and the second type of the print data selected by the user through the second user interface is recorded on a sheet according to the specified setting value, by an image recording apparatus which is configured to perform wireless communication with the network interface;
first reception processing of receiving a first touch operation through the user interface at a state where the preview image is displayed on the display, the first touch operation instructing execution of the recording processing of the print data user interface; and
output processing of, when the first touch operation is received in the first reception processing, transmitting recording instruction information to the image recording apparatus through the network interface, recording instruction information instructing the image recording apparatus to execute the recording processing of the print data.

20. A recording system comprising:
an information processing apparatus comprising a display, a user interface, a storage configured to store an external program and a printing program which are independently installed in the information processing apparatus, a first network interface, and a first processor configured to execute the external program and the printing program, when the printing program which is installed in the computer is executed by the computer, the printing program causing the computer to execute first user interface displaying process of displaying, on the display a first user interface which allows a user to select a first type of print data, when the external program is executed by the computer, the external program causing the computer to execute second user interface displaying process of displaying, on the display, a second user interface which allows the user to select a second type of print data different from the first type of print data, and
an image recording apparatus comprising a recording unit configured to execute recording processing of recording an image, a second network interface, and a controller,
wherein the printing program when executed by the processor, causes the information processing apparatus to execute:
third user interface displaying process of display, on the display, a third user interface which allows the user to select an activation of the external program;
external program executing processing of executing the external program when the user selects the activation of the external program through the third user interface;
after the external program is activated, external acquisition processing of acquiring the second type of print data selected by the user through the second user interface;
preview display processing of displaying a preview image on the display, the preview image representing a state where a print image represented by one of the first type of the print data selected by the user through the first user interface and the second type of the print data selected by the user through the second user interface is recorded on a sheet according to the specified setting value, by an image recording apparatus which is configured to perform wireless communication with the network interface;

first reception processing of receiving a first touch operation through the user interface at a state where the preview image is displayed on the display, the first touch operation instructing execution of the recording processing of the print data user interface; and output processing of, when the first touch operation is received in the first reception processing, transmitting recording instruction information to the image recording apparatus through the network interface, recording instruction information instructing the image recording apparatus to execute the recording processing of the print data, and wherein the controller is configured to cause the recording unit to execute the recording processing represented by the recording instruction information when the recording instruction information is received from the information processing apparatus through the second network interface.

* * * * *